United States Patent [19]

Richardson et al.

[11] Patent Number: 5,585,708
[45] Date of Patent: Dec. 17, 1996

[54] FOUR QUADRANT MOTOR CONTROLLER MINIMIZING DISTORTION INDEX

[75] Inventors: Robert D. Richardson, San Ramon; William L. Erdman, Livermore, both of Calif.

[73] Assignee: Kenetech Windpower, Inc., Livermore, Calif.

[21] Appl. No.: 384,628

[22] Filed: Feb. 6, 1995

Related U.S. Application Data

[60] Continuation of Ser. No. 224,109, Apr. 6, 1994, which is a division of Ser. No. 660,050, Feb. 22, 1991.

[51] Int. Cl.⁶ .................................................. H02P 5/40
[52] U.S. Cl. ..................... 318/800; 318/803; 318/806; 318/722; 318/807; 363/132; 363/98
[58] Field of Search .................... 318/772–774, 318/778, 780, 798–812, 823, 256, 254, 739, 727, 549, 722; 363/37, 49, 50, 51, 71–72, 136, 132–134, 17, 89, 98; 307/82, 85; 290/31; 322/32, 5, 42, 10, 7

[56] References Cited

U.S. PATENT DOCUMENTS

| | | | |
|---|---|---|---|
| 4,358,722 | 11/1982 | Iwakane et al. | 318/798 |
| 4,431,956 | 2/1984 | Ängquist | 318/762 |
| 4,443,747 | 4/1984 | Chausse et al. | 318/809 |
| 4,447,737 | 5/1984 | Cronin | 322/47 |
| 4,450,398 | 5/1984 | Bose | 318/803 |
| 4,611,158 | 9/1986 | Nagase et al. | 318/803 |

(List continued on next page.)

FOREIGN PATENT DOCUMENTS

| | | | |
|---|---|---|---|
| 3144188 | 6/1982 | Germany | H02P 5/36 |
| 60-237880 | 11/1985 | Japan | H02P 5/41 |
| 56125996 | 10/1991 | Japan | H02P 7/36 |

OTHER PUBLICATIONS

Murphy et al., "Power Electronic Control of AC Motors", *Pergamon Press*, 1988, pp. 123–146.
Niermeyer, et al., "AC–Motor Drive with Regenerative Braking and Reduced Supply Line", Aachen, 1989, pp. 1021–1026.
Ooi et al, "An Integrated AC Drive System Using a Controlled–Current PWM Rectifier/Inverter Link", *IEEE*, 1986, pp. 494–501.
Power Electronic Control of AC Motors, "Implementation of Field–Oriented Control", 1988, pp. 123–146.
Shoji et al., "Current Source Rectifier/Inverter System with Sinusoidal Currents", *IEEE*, 1988, pp. 909–914.
Brogan, W. L., "Modern Control Theory", Prentice Hall, New Jersey, 1985. (Performance taken from Chapter 17.)

(List continued on next page.)

*Primary Examiner*—John W. Cabeca
*Attorney, Agent, or Firm*—Blakely, Sokoloff, Taylor & Zafman

[57] ABSTRACT

A motor control apparatus and method is disclosed for controlling a multiphase AC motor by controlling electrical quantities such as voltage or current applied to the stator of the motor. The apparatus includes a motor command unit for defining a reference signal indicative of a desired motor parameter such as torque, speed, or position, a DC voltage link, a controller, a line-side converter including active switches in a bridge configuration for controlling the bidirectional flow of electrical power between the DC voltage link and a source of AC power, and a motor-side converter including active switches in a bridge configuration for controlling stator electrical quantities by controlling the bidirectional flow of electrical power between the DC voltage link and the motor, where the motor-side converter includes control means responsive to the reference signal for controlling the active switches to produce stator electrical quantities that correspond to the reference signal.

20 Claims, 13 Drawing Sheets

Microfiche Appendix Included
(119 Microfiche, 2 Pages)

U.S. PATENT DOCUMENTS

| | | | |
|---|---|---|---|
| 4,625,160 | 11/1986 | Hucker | 322/32 |
| 4,628,240 | 12/1986 | Kurakake et al. | 318/723 |
| 4,649,331 | 3/1987 | Jahns | 318/806 |
| 4,651,068 | 3/1987 | Meshkat-Razavi | 318/254 |
| 4,680,525 | 7/1987 | Kobari et al. | 318/806 |
| 4,700,081 | 10/1987 | Kos et al. | 290/44 |
| 4,752,726 | 6/1988 | Aoyama | 323/207 |
| 4,772,802 | 9/1988 | Glennon et al. | 290/31 |
| 4,792,742 | 12/1988 | Fujimoto et al. | 318/805 |
| 4,800,327 | 1/1989 | Fujioka et al. | 318/798 |
| 4,862,343 | 8/1989 | Nomura et al. | 363/41 |
| 4,890,213 | 12/1989 | Seki | 307/85 |
| 4,891,744 | 1/1990 | Yamamoto et al. | |
| 4,903,184 | 2/1990 | Hirose | 363/37 |
| 4,908,565 | 3/1990 | Cook et al. | 322/32 |
| 4,922,400 | 5/1990 | Cook | 363/37 |
| 4,924,168 | 5/1990 | Horie et al. | 318/811 |
| 4,926,108 | 5/1990 | Schooley et al. | 322/22 |
| 4,935,860 | 6/1990 | Kirchberg et al. | 363/37 |
| 4,942,511 | 7/1990 | Lipo et al. | 363/136 |
| 4,947,100 | 8/1990 | Dhyanchand et al. | 363/71 |
| 4,968,925 | 11/1990 | De Doncker | 318/800 |
| 5,006,768 | 4/1991 | Rozman | 318/778 |
| 5,012,169 | 4/1991 | Ono et al. | 318/599 |

OTHER PUBLICATIONS

Erdman, W. L., "A Trajectory Sensitivity Approach to Parameter Disturbance Problems in Indirect Filed Oriented Drives", Ph.D. Dissertation, University of Missouri, 1989.

Ertl, H. et al., "Analysis of Different Current Control Concepts for Forced Commutated Rectifier", presented at the Power Conversion International Conference, Jun. 17–19, 1986.

Leonard, W., "Control of Electrical Drives", Springer—Verlag, Heidelberg, 1985, Chapters 9–12.

Nishimoto, M. et al., "An Integrated Controlled–Current PWM Rectifier Chopper Link for Sliding Mode Position Control", Presented at the IEE Industry Application Society Annual Meeting, 1986.

Zoigas, P. D. et al., "Optimum System Design of the Three–Phase PWM Rectifier–Inverter Type Frequency Changer", Presented at the IEE Industry Application Society Annual Meeting, 1985.

Sul, et al., "Design of an Optimal Discrete Current Regulator", *IEEE Industry Applications Society Annual Meeting, Part* 1, 1989, pp. 348–354.

FIELD ORIENTATION CONVERTER

DELTA MODULATOR CURRENT CONTROLLER

FOUR QUADRANT MOTOR CONTROLLER MINIMIZING DISTORTION INDEX

This is a continuation of application Ser. No. 08/224,109, filed Apr. 6, 1994, which is a divisional of application Ser. No. 07/660,050, filed Feb. 22, 1991.

REFERENCE TO MICROFICHE APPENDIX

Reference is hereby made to a microfiche appendix submitted herewith, consisting of two microfiche of 119 frames.

BACKGROUND OF THE INVENTION

1. Field of the Invention

This invention relates generally to AC motor drives or controllers, and relates more particularly to a motor controller that provides four quadrant control of the torque, speed, or position of a motor at a controlled power factor.

2. Description of the Relevant Art

A prior controller for an AC induction motor uses switched inverters to control the currents applied to the stator windings of the motor. For a three-phase motor, the inverter includes six active switches arranged in a bridge configuration between a DC bus and the motor. A diode bridge is coupled between the DC bus and a utility source of AC power and charges the DC bus by rectifying the supplied AC electrical power. Field oriented control can be used to control the current supplied to the motor.

This type of controller has certain drawbacks. The diode bridge generates harmonic currents that distort the utility voltage. These harmonic currents require additional VA power from the utility source, thus reducing overall system efficiency.

Another drawback is that the diode bridge is not capable of returning power to the utility source. When the motor is running as a generator in the second and fourth quadrants of torque/speed plane, the power generated is shunted to ground through a DC bus resistor. Again, this results in low system efficiency.

Still another drawback is that the dynamic performance of the field oriented current controller at high speeds is degraded since the diode bridge limits the maximum DC bus voltage. This results in performance degradation at high speeds.

SUMMARY OF THE INVENTION

In accordance with one embodiment, the present invention includes a motor controller for controlling a multiphase AC motor by controlling electrical quantities such as voltage or current applied to the stator of the motor. The apparatus comprises a motor command unit for defining a reference signal indicative of a desired motor parameter such as torque, speed, or position, a DC voltage link including a capacitor or other means for storing energy, a line-side power converting circuit (converter) including active switches in a bridge configuration for controlling the bidirectional flow of electrical power between the DC voltage link and a source of AC power, and a motor-side power converting circuit (converter) including active switches in a bridge configuration for controlling stator electrical quantities by controlling the bidirectional flow of electrical power between the DC voltage link and the motor, where the motor-side converter includes control means responsive to the reference signal for controlling the active switches therein to produce stator electrical quantities that correspond to the reference signal.

The present invention includes a method for controlling a multiphase AC motor, where a motor-side converter includes active switches coupled in a bridge configuration between a DC voltage link and stator windings of the motor, and where a line-side converter includes active switches coupled in a bridge configuration between a source of AC power and the DC voltage link. The method comprises the steps of controlling the bidirectional flow of electrical power through the motor-side converter by defining a reference signal indicative of a desired motor parameter and controlling the active switches therein to produce stator electrical quantities that correspond to the reference signal, and controlling the bidirectional flow of electrical power through the line-side converter, including the steps of monitoring the voltage of the DC voltage link, comparing the measured voltage of the DC voltage link to a desired voltage thereof, and controlling the active switches therein to regulate the direction and flow of electrical power therethrough.

The invention further includes an apparatus and method for controlling the motor-side converter using field orientation control by defining a desired torque-producing quadrature axis current in field coordinates and controlling the active switches to produce stator electrical quantities that correspond to the desired quadrature axis current. The desired motor parameter, either torque, speed, or position, is reduced to a desired torque level that corresponds to the desired motor parameter, and then the field orientation control defines stator currents or voltages that correspond to the desired torque.

The field oriented control defines the motor operation in terms of a rotating frame of reference to decouple flux-producing currents from torque-producing currents. The desired motor operation is defined by a desired direct axis (flux-producing) current in rotating field coordinates aligned with the direction of the rotor flux field and a desired quadrature axis (torque-producing) current in field coordinates oriented normal to the rotor flux field. Motor torque, speed, or position is controlled by controlling the quadrature axis current. The angle of the field coordinate system with respect to a stationary frame of reference defines a desired rotor flux angle, which is periodically determined and used to convert the desired direct and quadrature axis currents from field coordinates into stator coordinates. A pulse width modulation circuit controls the active switches of the motor-side converter to produce stator electrical quantities that correspond to the desired stator electrical quantities.

The stator electrical quantities that are regulated are either currents or voltages. When regulating currents, desired currents defined by the field oriented control are converted to desired stator currents, and the active switches of the motor-side converter are controlled to produce corresponding stator currents. When regulating voltages, the desired field oriented currents are converted into desired field oriented voltages by compensating for cross-coupling between the direct and quadrature axes, the desired field oriented voltages are converted into desired stator voltages, and the active switches are controlled to produce corresponding stator voltages.

In one embodiment, the motor-side converter regulates the motor torque, speed, or position by controlling the stator currents at a low speed of rotation of the motor and by controlling the stator voltages at a higher speed of rotation of the motor. During low speed operation of the motor, the orientation of the rotor flux field with respect to the rotor is controlled by switching the active switches of the motor-side converter to regulate currents in the stator, while during the higher speed operation of the motor, the orientation of the rotor flux field is controlled by switching the active switches to regulate voltages in the stator. Switching between current control and voltage control is preferably controlled by a rotor speed signal that indicates rotor speed.

One embodiment of a current controller of the present invention is particularly useful for controlling currents through both the motor-side and the line-side of the motor controller. This current controller periodically determines a distortion index indicating errors between desired and actual currents, and controls the active switches to produce currents that minimize the distortion index.

The present invention further includes an apparatus and method for controlling the active switches of the line-side converter to supply line electrical power at a desired angle between voltage and current. This aspect of the invention includes a line-side controller that forms a reference waveform, rotates the reference waveform by a selected power factor angle to yield a template waveform, uses the template waveform to define desired line currents, and controls the active switches to produce line currents corresponding to the desired line currents. This apparatus and method can be used, even when the motor is turned off, to supply reactive power to the utility.

An important advantage of the present invention is its ability to control the motor in all four quadrants of its torque/speed plane. In other words, the present invention controls the AC machine rotating in either direction and operating as either a motor or a generator. When operating as a generator, the present invention supplies low distortion power to the utility grid, instead of dissipating that energy through a resistor.

Another advantage of the present invention is its ability to control the DC bus voltage to levels higher than that of the prior art diode bridge rectifier. This improves the dynamic performance of the motor controller at high speeds.

One key feature of the present invention is the use of field orientation control of the motor-side converter to control torque, speed, or position of the motor. Field orientation decouples the torque-producing currents or voltages of the stator from the flux-producing currents or voltages and thus permits responsive control of the motor.

Another feature is a hybrid control strategy for the motor-side converter in controlling either the stator currents or stator voltages. Current control is used where the stator currents can be assumed to be supplied by current sources, which is a valid assumption at low rotor speeds due to a large margin between the voltage of the DC voltage link and the counter emf of the motor. Voltage control is used at higher rotor speeds where current control would otherwise require increasing the voltage of the DC voltage link proportional to speed to maintain responsive control and constant volts/hertz operation. Voltage control has an increased power capability over current control at higher speeds while maintaining constant volts/hertz operation and moderate DC link voltages, thus allowing the use of lower voltage switching devices than would be required for current control. Voltage control is also more efficient than current control at high speeds due to reduced switching losses in the motor-side converter due to lower DC link voltages for the same power level. Under voltage control, the stator voltages in field coordinates are compensated by decoupling factors to define two control voltages, one for controlling torque and the other for controlling rotor flux.

Still another feature of the invention is a particular current control algorithm, which determines optimum PWM commutation signals for the motor-side and line-side bridge inverters by minimizing a distortion index. This algorithm reduces total harmonic distortion over competing algorithms operating at comparable sampling frequencies, while reducing switching losses by reducing the number of switching events.

The line-side converter of the present invention provides power factor control by adjusting the line current anywhere between fully leading and fully lagging the line voltage, thereby supplying or absorbing selectable amounts of reactive power. This feature of the invention solves reactive power problems normally associated with induction motors, and also replaces power factor correction capacitors that would otherwise be needed on the utility line. Power factor correction can also take place when the motor is not in use.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENT

Figure 1:
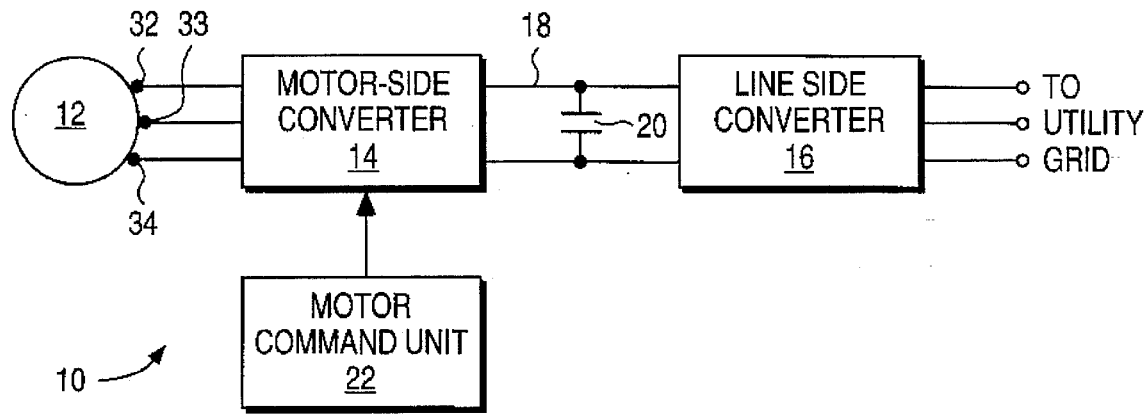
FIG. 1 is a block diagram of a motor control apparatus according to the present invention.

FIGS. 1 through 14 of the drawings disclose various embodiments of the present invention for purposes of illustration only. One skilled in the art will readily recognize from the following discussion that alternative embodiments of the structures and methods illustrated herein may be employed without departing from the principles of the invention.

The present invention is a motor controller, including both apparatus and method, for controlling a multiphase AC motor. In the preferred embodiment of the invention, shown in FIG. 1, the motor controller 10 is coupled to the stator windings of a three phase AC induction motor 12. The motor controller 10 controls the torque, speed, or position of the motor by controlling the stator currents or voltages applied to the stator windings 32–34. The motor controller 10 allows four quadrant operation of the motor 12, drawing power from the utility grid when acting as a motor and returning power to the grid when acting as a motor.

Essentially, the motor controller 10 includes a motor-side power converting circuit 14 that controls the bidirectional flow of electrical power to and from the motor 12, a line-side power converting circuit 16 that controls the bidirectional flow of electrical power to and from a source of AC power, and a DC voltage link 18 that links the motor-side and line-side converters and provides energy storage. The line-side converter 16 controls the direction, magnitude, and power factor of the electrical power flowing between the utility grid and the DC voltage link by converting between the fixed frequency AC at the source side and DC at the DC voltage link. The motor-side converter 14 controls the magnitude and frequency of the stator currents or voltages of the motor by converting between DC at the DC voltage link and variable frequency AC at the motor 12. A motor command unit 22 supplies a torque, speed, or position reference signal and a mode select signal to the motor-side converter 14, which, in response, controls the torque, speed, or position of the motor 12. The DC voltage link 18 couples the DC sides of the two converters, and includes a capacitor 20 for energy storage.

Figure 2:
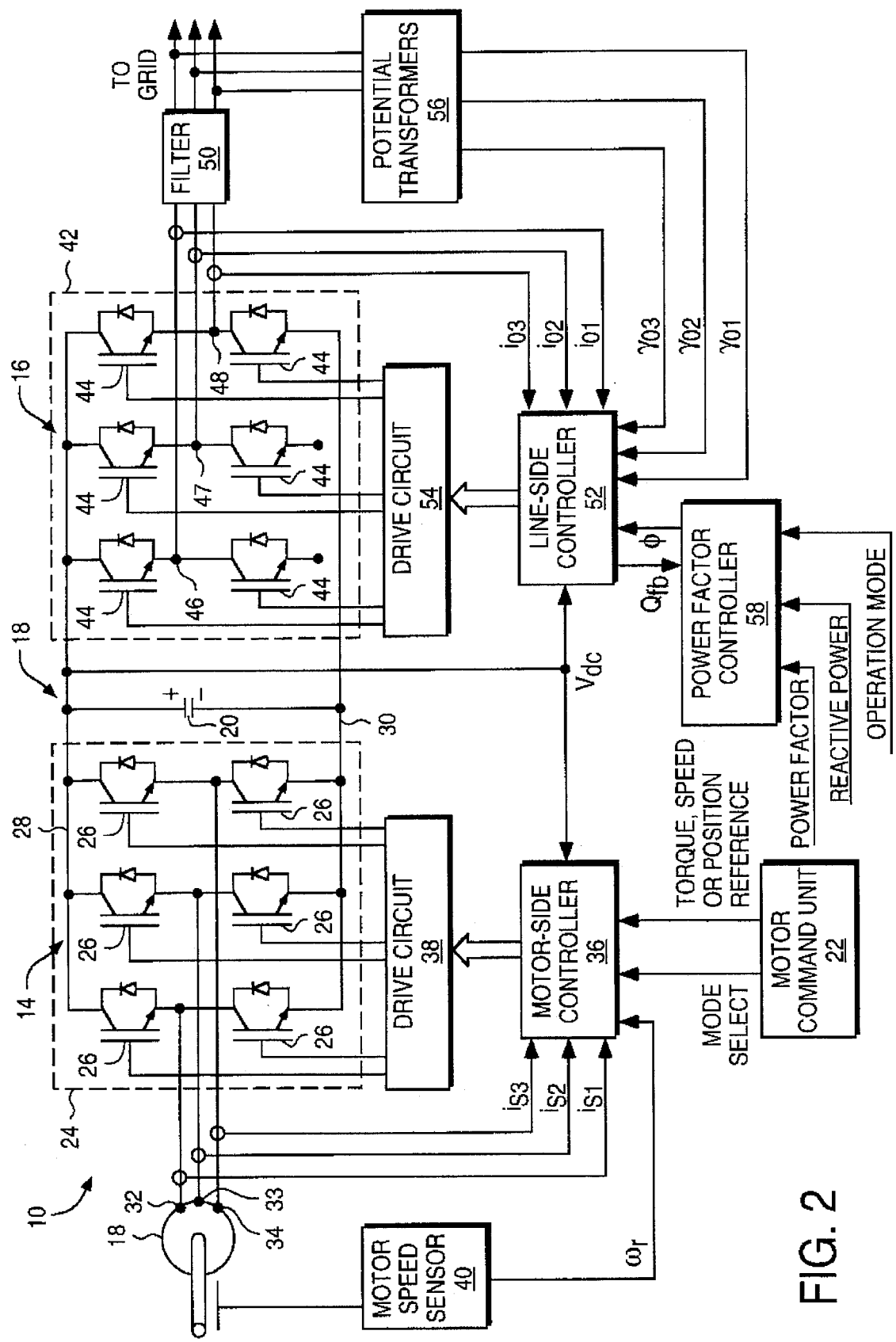
FIG. 2 is a schematic diagram of the motor control apparatus of the present invention.

More particularly, as shown in FIG. 2, the motor-side converter 14 includes a bridge circuit 24 having three pairs of active switching devices 26 arranged in a bridge configuration between a +DC rail 28 and a –DC rail 30 of the DC voltage link 18 and each of three stator windings 32–34 of the motor 12. Each pair of switching devices is coupled between the DC rails 28 and 30, and connected at an intermediate point to one of the stator windings. Commutation or drive signals that cause the active switching devices 26 to switch on and off originate in a motor-side controller 36, which supplies the signals to the switching devices through a drive circuit 38. The motor-side controller 36 is isolated from the motor-side bridge circuit 24 by optical isolators to minimize interference. The commutation signals are complementary for each pair of switching devices, causing one switching device of each pair to switch on and the other switching device of the pair to switch off, as appropriate to achieve the desired stator currents or voltages. The switching devices 26 of the motor-side bridge circuit 24 control the stator currents and voltages in the three phase stator windings of the motor 12. Also included within the motor-side converter is a motor speed sensor 40 that monitors the rotation of the rotor shaft 41 of the motor 12 and supplies a signal indicative of the rotor speed, $\omega_r$, to the motor-side controller 36.

The switching devices 26 of the motor-side converter 14 can be any of a number of different types of active switches, including insulated gate bipolar transistors (IGBT), bipolar junction transistors, field effect transistors, Darlington transistors, gate turn-off thyristors, or silicon controlled rectifiers. Each switching device 26 can consist of a single switch, or can include multiple switches connected in parallel. The switching devices 26 of the motor-side converter 14 are preferably IGBT's.

The motor-side controller 36 receives sensor inputs of the stator currents $i_{s1}$, $i_{s2}$, $i_{s3}$, and rotor speed $\omega_r$, receives a torque, speed, or position reference signal and a mode select signal from the motor command unit 22 and, in response, generates pulse width modulated (PWM) commutation signals and supplies them to the motor-side converter switches 26 through the drive circuit 38. Although FIG. 2 shows sensing of all three stator currents, only two currents need to be sensed because the third can be found from the relationship $i_{s1}+i_{s2}+i_{s3}=0$. The structure and operation of the motor-side controller 36 will be explained in further detail below.

The DC voltage link 18 consists simply of the two rails 28 and 30, plus a energy storage capacitor 20 connected between the two rails. Alternatively, energy storage could be provided by a battery connected between the two rails 28 and 30.

Situated on the other side of the DC voltage link from the motor-side converter 14, the line-side converter 16 includes a line-side bridge circuit 42 having three pairs of active switching devices 44 arranged in a bridge configuration between the +DC rail 28 and –DC rail 30 of the DC voltage link 18. The intermediate points of the pairs of active switching devices 44 form three line taps 46–48 that are connected through filters 50 to the utility grid and through which three phase electrical power flows into and out of the line-side converter 16. Commutation or drive signals for the active switching devices 44 originate in a line-side controller 52, which supplies the signals to the switching devices through a drive circuit 54. The line-side controller 52 is isolated from the bridge circuit 42 by optical isolators. The commutation signals are complementary for each pair of switching devices, causing one switching device of each pair to switch on and the other switching device of the pair to switch off at any given time.

The line-side controller 52 receives sensor inputs indicating the line currents $i_{o1}$, $i_{o2}$, $i_{o3}$, line voltages $v_{o1}$, $v_{o2}$, $v_{o3}$, and DC link voltage $v_{dc}$. The line currents are sensed at the line taps 46–48, while the line voltages are sensed at the utility grid side of the filters 50 and isolated through potential transformers 56. A power factor controller 58 supplies to the line-side controller 52 a power factor angle, $\phi$, that defines a desired angle between the voltage and current flowing into or out of the line-side converter 16. In response to all these inputs, as will be explained in further detail below, the line-side controller 52 generates pulse width modulated commutation signals and supplies them to the switches 44 through the drive circuit 54.

The power factor controller 58 determines the power factor angle, $\phi$, in response to a power factor signal, a reactive power signal, and an operation mode signal. These signals define a desired power factor or quantity of reactive power of the electrical power flowing between the motor controller 10 and the utility grid. In addition, the line-side controller 52 supplies to the power factor controller 58 a feedback signal, $Q_{fb}$, that indicates the reactive power being consumed or supplied by the line-side converter 16.

Returning to the motor side of the motor controller, a key element of the present invention is controlling the motor currents and voltages in terms of field coordinates. The electric torque of an AC induction machine can be expressed in terms of the stator and rotor currents, but such an expression is difficult to use in a motor control system since the rotor currents of a squirrel-cage induction motor cannot be directly measured. Field orientation control eliminates that difficulty.

Figure 3:
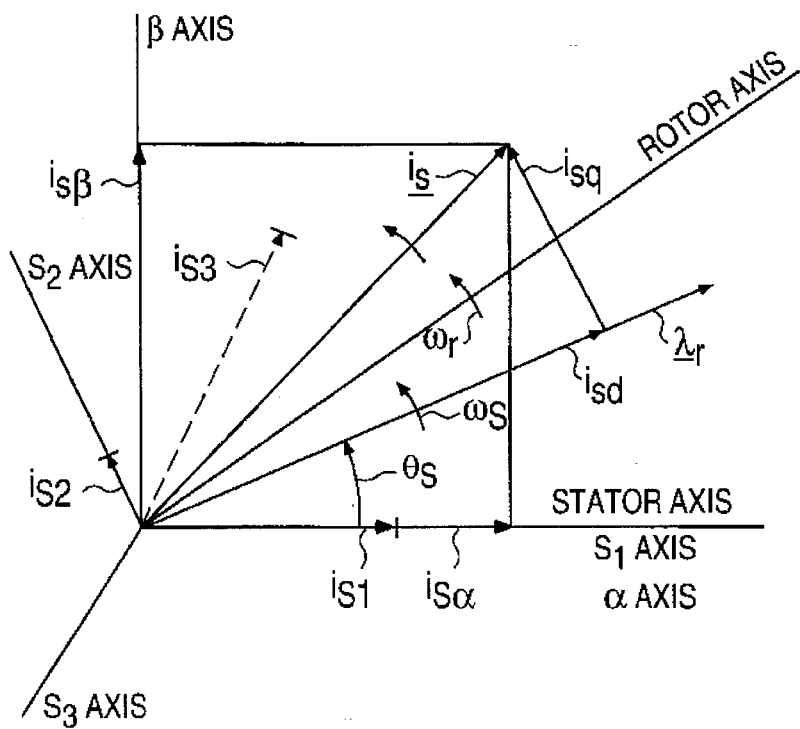
FIG. 3 is a graphical diagram illustrating the angular relationships between a fixed stator coordinate system, a rotating rotor coordinate system, and a rotating field oriented coordinate system.

It is important to understand that, at any instant of time, the rotor flux of an induction machine can be represented by a radial vector $\lambda_r$ with magnitude $\lambda_r$ and angle $\theta_s$. The field orientation principle defines the stator current in terms of a rotating d,q coordinate system, where a direct (d) axis is aligned with the instantaneous rotor flux vector $\lambda_r$ at angle $\theta_s$ and a quadrature (q) axis is perpendicular to the rotor flux vector. This is illustrated in FIG. 3. The stator current vector, $i_s$, can be degenerated into a component, $i_{sd}$, that is parallel to the rotor flux $\lambda_r$ vector and a component, $i_{sq}$, that is perpendicular to the rotor flux vector. The currents $i_{sd}$ and $i_{sq}$ at angle $\Theta_s$ are the field coordinate representation of the stator current vector.

FIG. 3 also illustrates that $\omega_r$ is defined as the rotor angular speed and $\omega_s$ is defined as the angular speed of the rotor flux vector. The machine slip speed, $\omega_{s1}$, which is the speed of the stator current vector with respect to the rotor, is the difference between $\omega_s$ and $\omega_r$.

The d,q coordinate system isolates or decouples a current that creates the rotor flux field, $i_{sd}$, on the direct axis, from a current that creates torque, $i_{sq}$, on the quadrature axis. Defining the motor currents in field orientation coordinates permits the motor-side controller 36 to convert a desired torque signal directly into a desired quadrature axis current, $i^*_{sq}$, which is then used by a current controller 76 or voltage controller 78 (FIG. 4) to carry out the torque, speed, or position commands of the motor command unit 22.

Controlling the motor 12 in this manner requires conversion between stationary stator coordinates and rotating field coordinates. The stator currents in a balanced, 3-phase coordinate system, as represented by the currents through the three stator windings 32–34 (FIG. 2), can be designated by the variables $i_{s1}$, $i_{s2}$, and $i_{s3}$. The balanced, 3-phase stator currents are equivalent to 2 phase stator currents, $i_{s\alpha}$ and $i_{s\beta}$, defined by the following matrix equation:

$$\begin{bmatrix} i_{s\alpha} \\ i_{s\beta} \\ 0 \end{bmatrix} = \begin{bmatrix} 1 & \cos(2\pi/3) & \cos(4\pi/3) \\ 0 & \sin(2\pi/3) & \sin(4\pi/3) \\ 1 & 1 & 1 \end{bmatrix} \begin{bmatrix} i_{s1} \\ i_{s2} \\ i_{s3} \end{bmatrix} \quad (1)$$

The 2 phase stator currents, $i_{s\alpha}$ and $i_{s\beta}$, can be converted into the field coordinate currents, $i_{sd}$ and $i_{sq}$, as a function of the rotor flux angle, $\Theta_s$, by the following transformation:

$$\begin{bmatrix} i_{sd} \\ i_{sq} \end{bmatrix} = \begin{bmatrix} \cos\theta_s & \sin\theta_s \\ -\sin\theta_s & \cos\theta_s \end{bmatrix} \begin{bmatrix} i_{s\alpha} \\ i_{s\beta} \end{bmatrix} \quad (2)$$

Transformation from field coordinates to 2 phase coordinates is accomplished by inverting equation (2), which results in the following:

$$\begin{bmatrix} i_{s\alpha} \\ i_{s\beta} \end{bmatrix} = \begin{bmatrix} \cos\theta_s & -\sin\theta_s \\ \sin\theta_s & \cos\theta_s \end{bmatrix} \begin{bmatrix} i_{sd} \\ i_{sq} \end{bmatrix} \quad (3)$$

Transformation from 2-phase to balanced 3-phase coordinates is found by inverting equation (1):

$$\begin{bmatrix} i_{s1} \\ i_{s2} \\ i_{s3} \end{bmatrix} = \begin{bmatrix} 2/3 & 0 & 1/3 \\ -1/3 & 1/\sqrt{3} & 1/3 \\ -1/3 & -1/\sqrt{3} & 1/3 \end{bmatrix} \begin{bmatrix} i_{s\alpha} \\ i_{s\beta} \\ 0 \end{bmatrix} \quad (4)$$

Representations of the stator current vector in the rotating d,q field coordinate system, in the stationary 2-phase $\alpha,\beta$ coordinate system, and in the stationary balanced 3-phase coordinate system are shown in FIG. 3.

Field orientation principles are utilized in the motor controller 10 of the present invention to obtain torque, speed, or position control of the motor. A desired torque signal, T*, is defined from a reference signal supplied by the motor command unit 22 and is converted into a desired quadrature axis current, $i^*_{sq}$. The desired quadrature axis current is then used to generate the PWM commutation signals that switch the motor-side bridge inverter 24. The reference signal supplied by the motor command unit 22 can be either a torque, speed, or position reference.

Figure 4:
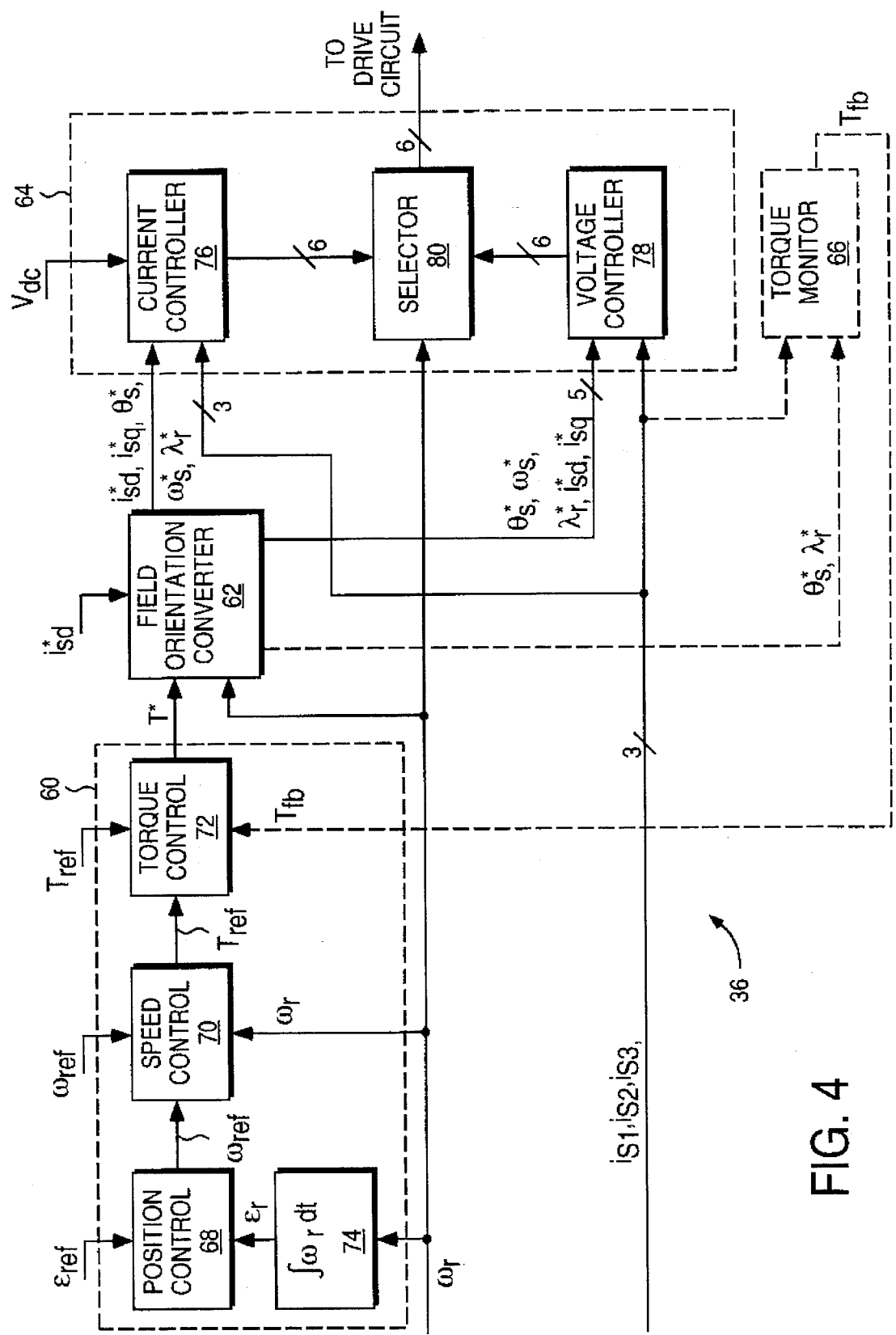
FIG. 4 is a block diagram of a motor-side controller of the present invention.

The structure of the motor-side controller 36 is shown in block diagram form in FIG. 4. The motor-side controller is preferably implemented in a digital signal processor ("DSP"), a Texas Instruments model TMS320C25. The computations performed within the DSP of the motor-side controller 36 are digital, which requires A/D conversion of the external signals. Computer code for implementing the invention in a DSP is disclosed in the microfiche appendix.

The motor-side controller 36 includes a reference signal generator 60, a field orientation converter 62, and a PWM controller 64. These components will be explained in more detail below, but basically, the reference signal generator 60 uses a torque, speed, or position reference signal to define a desired motor torque, the field orientation converter 62 uses the desired motor torque and sensed rotor speed to define control parameters in field coordinates, and the PWM controller 64 takes the control parameters and generates pulse-width modulated commutation signals for the motor-side bridge circuit 24. Optionally, the motor-side controller 36 may also include a torque monitor 66 for closed-loop torque control. The control parameters defined by the reference signal generator 60 and the field orientation converter 62 are identified as control variables by the * superscript.

The reference signal generator 60 defines a desired torque signal, T*, that represents the motor torque that will result in the desired torque, speed, or position of the motor, depending on the mode of operation. The reference signal generator 60 includes a position control unit 68, a speed control unit 70, and a torque control unit 72, as shown in FIG. 4. A position reference signal, $\epsilon_{ref}$, a speed reference signal, $\omega_{ref}$, or a torque reference signal, $T_{ref}$, is supplied by the motor command unit 22, depending on the control mode selected. When operating in torque control mode, the torque control unit 72 alone defines the desired torque signal, T*, either open-loop or closed-loop. When operating in speed control mode, the speed control unit 70 defines the desired torque signal, T*, from the rotor speed signal, $\omega_r$, and the speed reference signal, $\omega_{ref}$. When operating in position control mode, the position control unit 68 defines the speed reference signal, $\omega_{ref}$, from the position reference signal, $\epsilon_{ref}$, and an actual rotor position signal, $\epsilon_r$, and the speed control unit 70 defines the desired torque signal, T*.

The position control unit 68, when activated, provides closed-loop position control of the motor. The position control unit 68 receives from the motor command unit 22 the position reference signal, $\epsilon_{ref}$, that defines the desired angular position of the motor. The position control unit 68 also receives a signal indicating actual rotor position, $\epsilon_r$, either sensed directly or derived by integrating the rotor speed signal, $\omega_r$, using an integrator 74. The position control unit 68 compares the desired and actual position signals, defines a position error signal ($\epsilon_{ref}-\epsilon_r$) and sends it through a proportional controller to define a speed reference signal in the form of $\omega_{ref}=k_{p1}(\epsilon_{ref}-\epsilon_r)$, where $k_{p1}$ is selected to provide adequate stability. The speed reference signal, $\omega_{ref}$, is output to the speed control unit 70.

The speed control unit 70, when operating in either position or speed control, takes the speed reference signal, $\omega_{ref}$, generated by either the position control unit 68 or the motor command unit 22, respectively, compares it to the actual rotor speed, $\bullet_r$, and runs the result through a proportional-integral controller to define the torque reference signal, $T_{ref}$. Mathematically, the operation of the speed control unit 70 is expressed by the following:

$$T_{ref} = k_{p2} (\epsilon_{ref} - \epsilon_r) + k_i \int (\epsilon_{ref} - \epsilon_r) \, dt \tag{5}$$

where $k_{p2}$ and $k_i$ are coefficients selected to provide adequate stability. When operating in speed control mode, the speed control unit 70 provides closed-loop control of motor speed.

The torque control unit 72 receives the torque reference signal, $T_{ref}$, from either the speed control unit 70 or the motor command unit 22 and limits the magnitude so that it does not exceed a predetermined range. The result of the limiting performed by the torque control unit 72 is the desired torque signal, T*. When the torque control mode is selected, the torque control unit 72 can provide either open-loop or closed-loop control of the motor 12. If open-loop, the torque control unit 72 receives the torque reference signal, $T_{ref}$, from the motor command unit 22 and limits the magnitude as described above. If closed-loop, the torque control unit 72 receives from the torque monitor 66 a feedback signal, $T_{fb}$, indicating motor torque, defines a torque error signal, runs it through a proportional-integral controller and a limiter to generate the desired torque signal, T*.

The optional torque monitor 66, which is needed for closed-loop torque control, infers motor torque from the measured stator currents, generates a signal indicative of actual torque, $T_{fb}$, and feeds it back to the torque control unit 72. To do so, the torque monitor 66 senses the actual stator currents, $i_{s1}$, $i_{s2}$, $i_{s3}$, converts them to field coordinate values using equations (1) and (2), and calculates a torque signal, $T_{fb}$, using equation (9) (see below) for feedback to the torque control unit 72.

The PWM controller 64 of the motor-side controller 36 controls stator electrical quantities of the motor 12, either the stator currents or the stator voltages, depending on the rotor speed. In the preferred embodiment, the PWM controller 64 includes a current controller 76, a voltage controller 78, and a selector circuit 80. The current controller 76 or the voltage controller 78 generates PWM commutation signals for the active switching devices 26 of the motor-side bridge circuit 24, and the selector circuit 80 chooses which of the PWM commutation signals to output to the drive circuit 38. The current and voltage controllers will be explained in further detail below.

Figure 5:
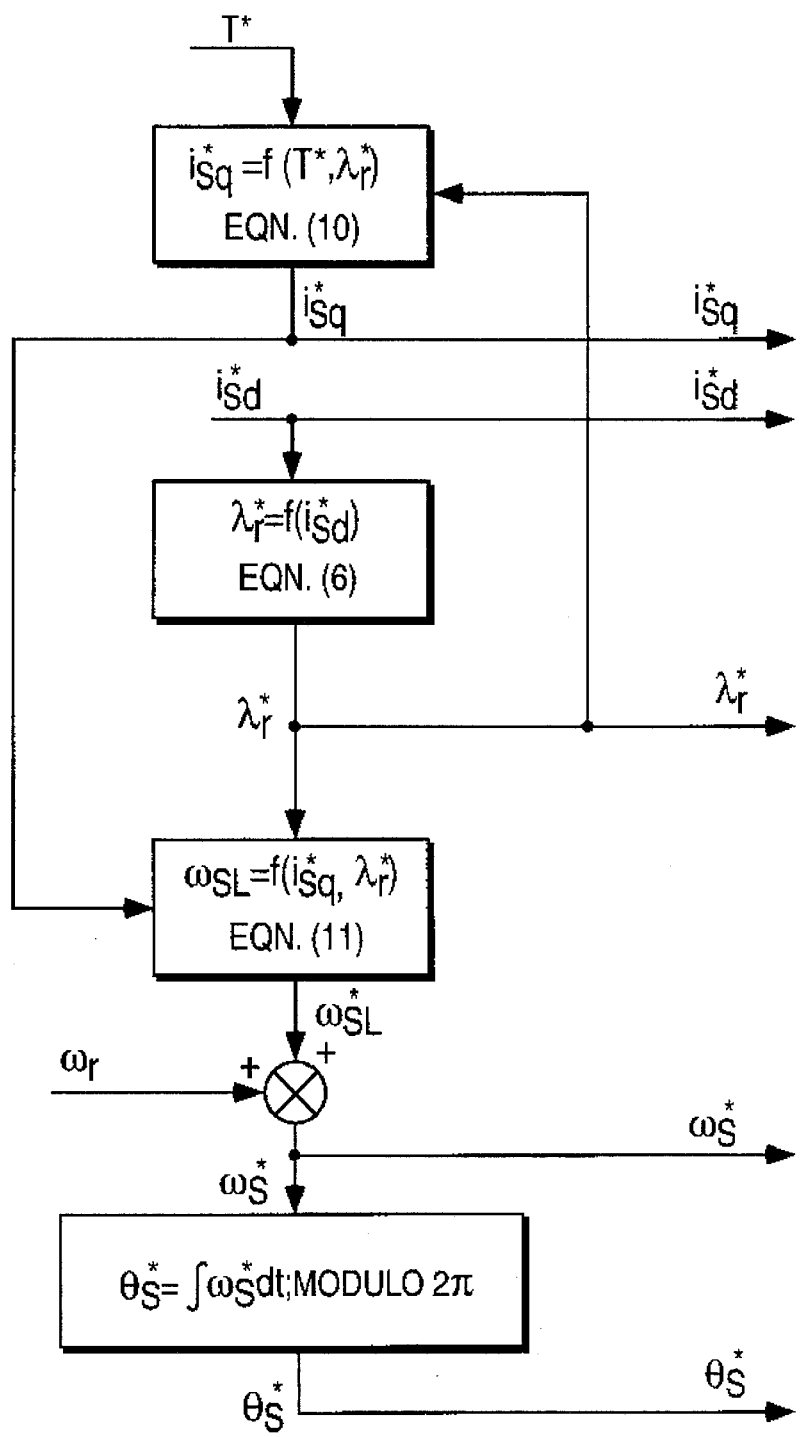
FIG. 5 is a block diagram of a field orientation converter of the present invention.

The field orientation converter 62 of the motor-side controller 36 converts the desired torque, T*, and the sensed rotor speed, $\omega_r$, into desired field oriented control currents $i^*_{sd}$ and $i^*_{sq}$, and a desired rotor flux angle, $\Theta^*_s$. As shown in FIG. 5, the field orientation converter 62 computes the desired magnitude of the rotor flux, $\lambda^*_r$, using a desired (flux-producing) direct axis current, $i^*_{sd}$. The desired direct axis current, $i_{*sd}$, is a function of the particular motor used, and can be predetermined and stored in the DSP. In the preferred embodiment, $i^*_{sd}$ is assumed to be constant. Alternatively, $i^*_{sd}$ can be varied to provide field weakening control, if desired. Again, the notation * designates a desired value defined by the control system as opposed to an actual value.

The desired rotor flux, $\lambda^*_r$, is defined by the following equation:

$$\dot{\lambda}^*_r = \frac{-R_r \lambda^*_r}{L_r} + \frac{R_r L_o i_{sd}^*}{L_r} \tag{6}$$

where:

$\lambda^*_r$ = desired rotor flux;

$\dot{\lambda}^*_r$ = time derivative of desired rotor flux;

$R_r$ = rotor resistance;

$L_o$ = mutual inductance;

$L_r$ = rotor self inductance.

In the general case, equation (6) can be represented by the following recursive equation:

$$\lambda_{r(k)}^* = \lambda_{r(k-1)}^* - \frac{\Delta t \, R_r \, \lambda_{r(k-1)}^*}{L_r} + \frac{\Delta t \, R_r \, L_o \, i_{sd(k-1)}^*}{L_r} \tag{7}$$

where:

$\lambda^*_{r(k)} = \lambda^*_r$ at time=k;

$\lambda^*_{r(k-1)} = \lambda^*_r$ at time=k-1;

$i^*_{sd(k-1)} = i^*_{sd}$ at time=k-1;

$\Delta t$ = sample time period between time=k-1 and time=k.

In the case where $i^*_{sd}$ is constant, the time derivative $\dot{\lambda}^*_r = 0$, so that equation (7) simplifies to:

$$\lambda^*_r = L_o \, i^*_{sd} \tag{8}$$

Once the rotor flux is known, the desired torque can be converted into quadrature axis current. In field coordinates, the torque generated by the motor is given by:

$$T = \frac{P L_o \lambda_r i_{sq}}{3 L_r} \tag{9}$$

where:

T = motor torque;

P = number of motor poles;

$i_{sq}$ = quadrature axis current.

Solving equation (9) for $i_{sq}$, yields the following expression for desired torque-producing quadrature axis current as a function of the desired torque:

$$i_{sq}^* = \frac{3 L_r T^*}{P L_o \lambda_r^*} \tag{10}$$

where T* is the desired torque defined by the reference signal generator 60.

Once the desired rotor flux, $\lambda^*_r$, and desired quadrature axis current, $i^*_{sq}$, have been determined, the desired rotor flux angle, $\Theta^*_s$, at a particular instant of time can be found. This is accomplished by solving the following equations:

$$\omega_{s1}^* = \frac{R_r L_o i_{sq}^*}{L_r \lambda_r^*} \tag{11}$$

$$\omega_s^* = \omega_r + \omega_{s1}^* \tag{12}$$

$$\theta_s^* = \int \omega_s^* dt, \; 0 \leq |\theta_s^*| \leq 2\pi \tag{13}$$

where:

$\omega^*_{s1}$ = desired machine slip speed;

$\omega^*_s$ = desired rotor flux speed;

$\omega_r$ = actual rotor speed;

$\theta^*_s$ = desired instantaneous rotor flux angle.

Machine slip speed, $\omega^*_{s1}$, is found from the calculated values of desired rotor flux, $\lambda^*_r$, and desired quadrature axis current $i^*_{sq}$, using equation (11). The measured rotor speed, $\omega_r$, is then added to the machine slip speed, $\omega^*_{s1}$, to find the desired rotor flux speed, $\omega^*_s$, according to equation (12). The desired rotor flux speed $\omega^*_s$ is then integrated modulo $2\pi$ to find the desired instantaneous rotor flux angle, $\theta^*_s$.

The computed values for desired field oriented currents, $i^*_{sd}$ and $i^*_{sq}$, rotor flux, $\lambda^*_r$, rotor flux speed, $\omega^*_s$, and rotor flux angle, $\theta^*_s$, are available to the current and voltage controllers 76 and 78 (FIG. 4) for determination of the PWM commutation signals. Transformation of the desired stator currents from field coordinates into stationary 2-phase $\alpha,\beta$ coordinates or balanced 3-phase coordinates, if required by the current controller 76 or voltage controller 78, can be accomplished either in the field orientation converter or in the current or voltage controller. Here, it is assumed that the transformations occur outside of the field orientation converter 62.

In response to the values computed by the field orientation converter 62, either the current controller 76 or the voltage controller 78, depending on which is selected, determines switch states for the active switching devices 26 of the motor-side bridge circuit 24 (FIG. 2). The current controller 76 generates PWM commutation signals by choosing a switch state that causes stator currents to approximate the desired currents defined by the field orientation converter. The voltage controller 78 generates PWM commutation signals by converting the desired field oriented currents into desired field oriented voltages, transforming them into stator coordinates, and then selecting the appropriate switch state to obtain the desired stator voltages.

Figure 6:
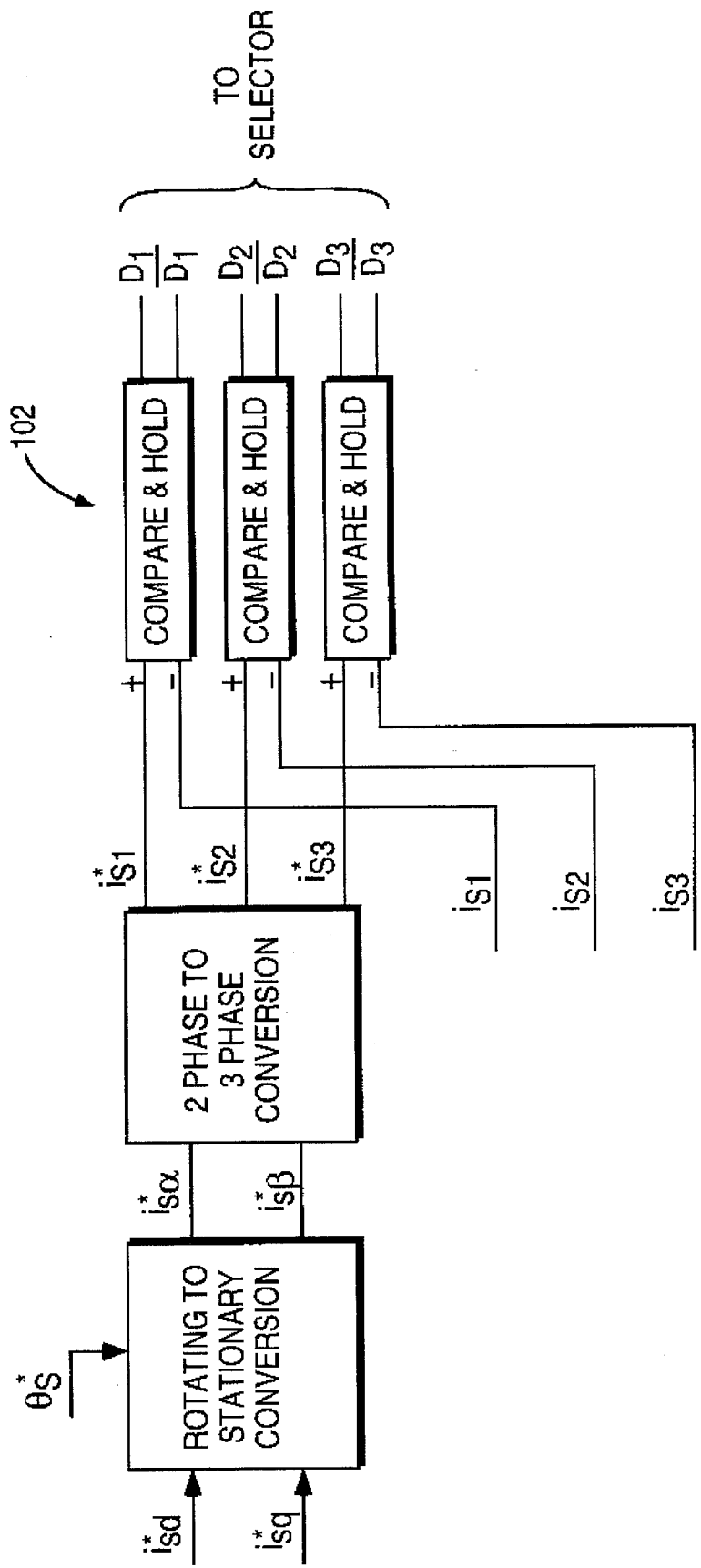
FIG. 6 is a block diagram of a delta modulator current controller of the present invention.

One simple method of current control is illustrated in FIG. 6, a delta modulator current controller. The delta modulator current controller converts the desired field oriented currents into stationary 2-phase stator coordinates, and then to 3-phase stator coordinates to generate desired 3-phase stator currents $i^*_{s1}$, $i^*_{s2}$, $i^*_{s3}$.

Transforming the desired currents from rotating field coordinates to stationary 2-phase $\alpha,\beta$ coordinates is achieved by equation (3), which reduces to the following:

$$i^*_{s\alpha} = i^*_{sd} \cos\theta^*_s - i^*_{sq} \sin\theta^*_s \tag{14}$$

$$i^*_{s\beta} = i^*_{sd} \sin\theta^*_s + i^*_{sq} \cos\theta^*_s \tag{15}$$

The desired stator currents are then transformed into 3-phase coordinates using equation (4).

After converting the desired stator currents from field coordinates into 3-phase coordinates, the delta modulator current controller then periodically compares each desired stator current $i^*_{s1}$, $i^*_{s2}$, $i^*_{s3}$, with the corresponding actual stator current $i_{s1}$, $i_{s2}$, $i_{s3}$, using compare and hold devices 82. If the desired stator current for a phase is greater than the actual stator current, then the upper switching device is switched on and the lower switching device switched off, otherwise, the upper device is switched on and the lower device is switched off. The compare and hold devices 82 set the PWM commutation signals, $D_1$, $\overline{D}_1$, $D_2$, $\overline{D}_2$, $D_3$, $\overline{D}_3$ to accomplish the desired switching. The notation $D_n$ and $\overline{D}_n$ refers to the base drive signals for the upper ($D_n$) and lower ($\overline{D}_n$) devices of one pair of motor-side converter switches 26. The switch state so selected remains in effect until the next sample period occurs, at which time the comparisons are performed with updated actual and desired values.

Figure 7:
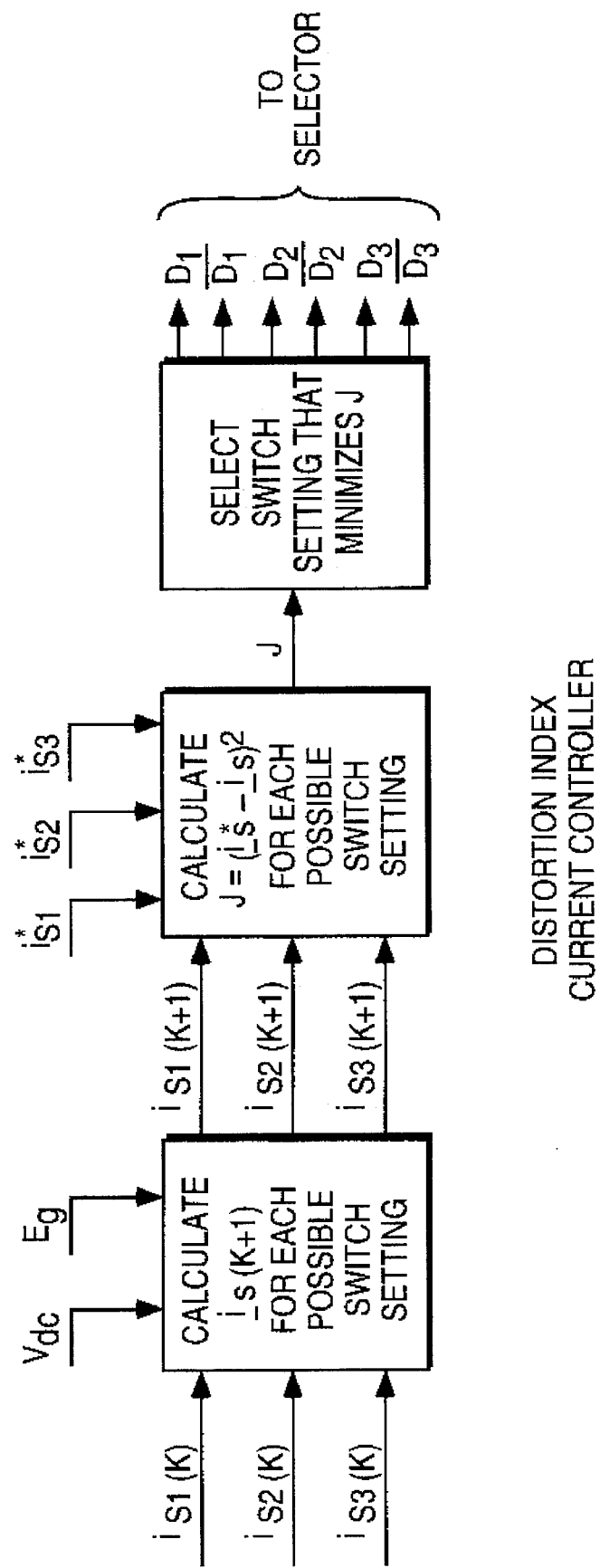
FIG. 7 is a block diagram of a distortion index current controller of the present invention.
Figure 8:
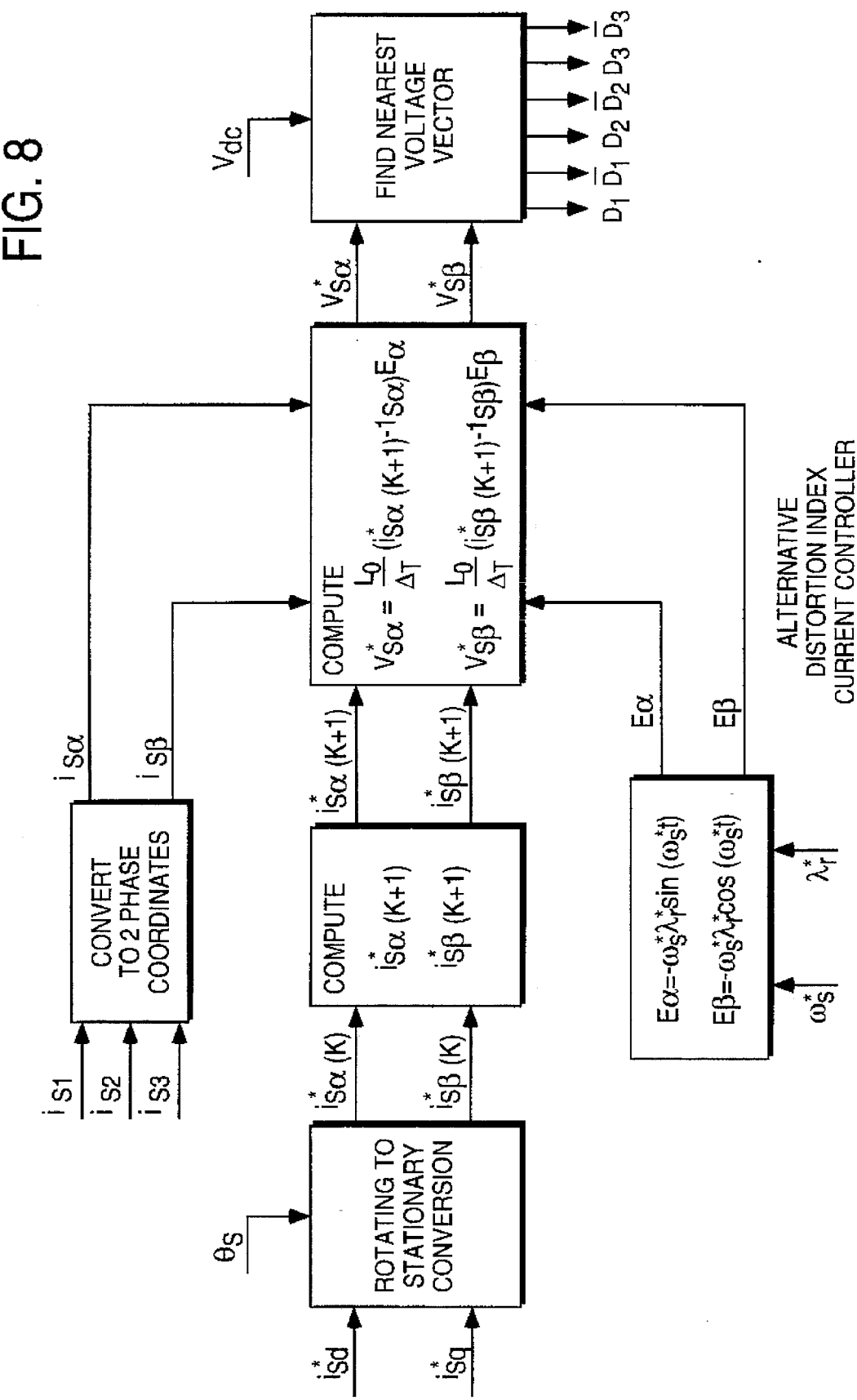
FIG. 8 is a block diagram of an alternative implementation of the distortion index current controller.
Figure 9:
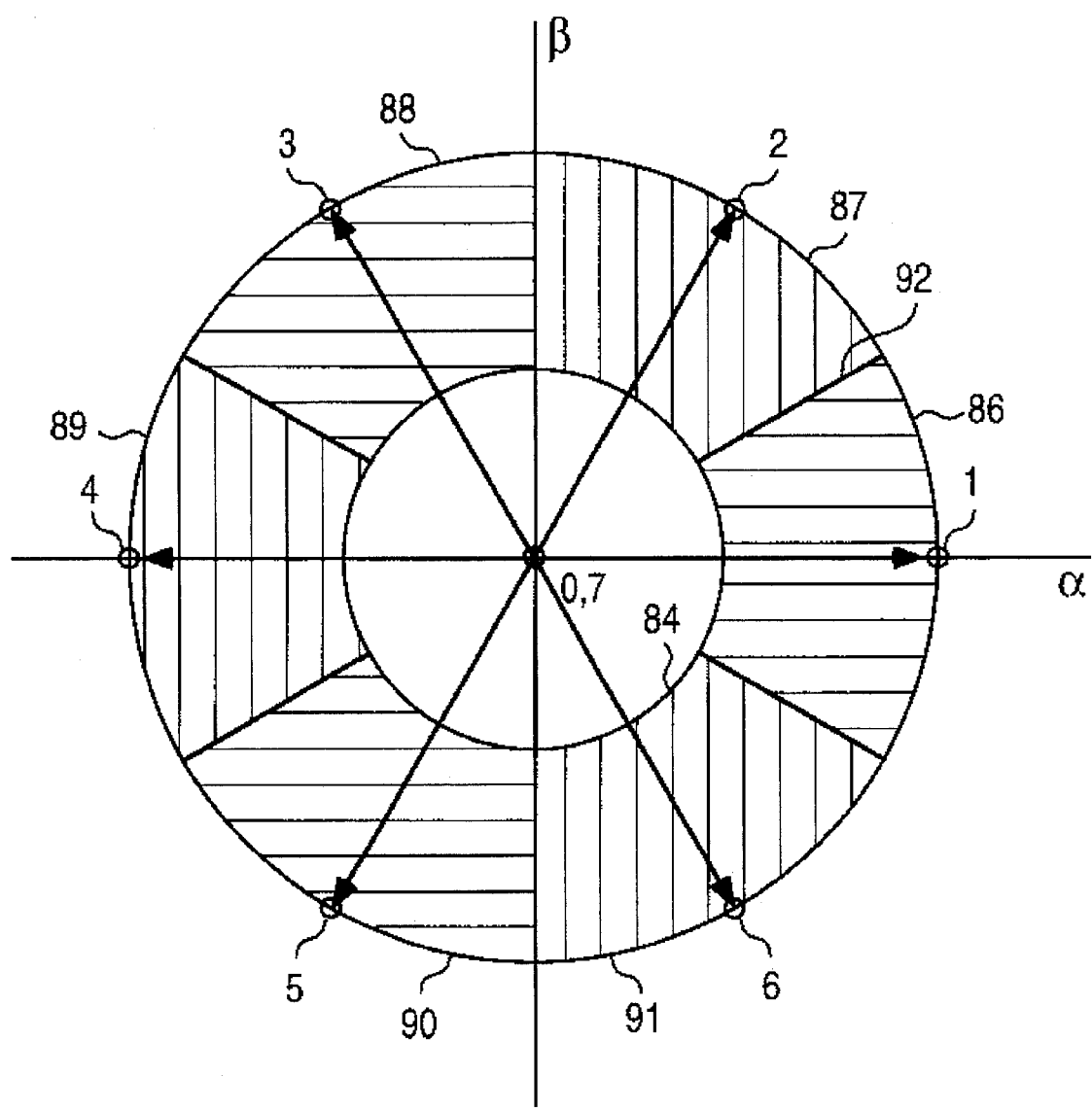
FIG. 9 is a graphical representation, in $\alpha,\beta$ coordinates, of voltage vectors resulting from eight possible switch states of a bridge inverter.

Another method of current control, one that minimizes a distortion index, is illustrated in FIGS. 7–9. This method generates PWM signals by periodically minimizing a distortion index related directly to total harmonic distortion (THD). In comparison with the delta modulator current controller or with a linear controller with triangular crossing, this method is preferable due to lower THD at comparable frequencies, while requiring fewer switching events and, consequently, less power loss due to switching. The distortion index that is minimized may be defined as the sum of the squares of the current errors:

$$J_1 = (i^*_{s1} - i_{s1})^2 + (i^*_{s2} - i_{s2})^2 + (i^*_{s3} - i_{s3})^2 \tag{16}$$

where, $i^*_{s1}$, $i^*_{s2}$, $i^*_{s3}$ are the desired 3-phase stator currents, and $i_{s1}$, $i_{s2}$, $i_{s3}$ are the actual 3-phase stator currents. Alternatively, the distortion index can be defined as the sum of the absolute values of the current errors.

$$J_2 = |i^*_{s1} - i_{s1}| + |i^*_{s2} - i_{s2}| + |i^*_{s3} - i_{s3}| \tag{17}$$

Minimizing the distortion index, J, involves determining which of eight possible switch states of the motor-side switches 26 will produce actual stator currents nearest in value to the desired stator currents. One way to accomplish this is shown in FIG. 7. Switching decisions are made periodically, based on the most recently measured stator currents. The actual stator currents $i_{s1(k)}$, $i_{s2(k)}$, and $i_{s3(k)}$, are measured at time=k, and a projection is made of the stator currents $i_{s1(k+1)}$, $i_{s2(k+1)}$, and $i_{s3(k+1)}$ at the next interval of time, for each possible switch state. Since there are two possible switch settings for each of the three switch pairs, there are eight ($2^3$) possible switch states for the motor-side converter switches. The projected stator currents $i_{s1(k+1)}$, $i_{sw(k+1)}$, and $i_{s3(k+1)}$ are found by modeling the motor and motor-side converter according to the following equation derived from a simplified model:

$$\underline{V} = \underline{E} + L_o \frac{d}{dt}(\underline{i}_s) \tag{18}$$

where $\underline{V}$=voltage vector resulting from a particular switch state;

$\underline{E}$=motor emf vector;

$\underline{i}_s$=stator current vector.

Evaluating the derivative over a discrete time interval, $\Delta t$, yields the following for the projected currents:

$$\underline{i}_{s(k+1)} = \frac{\Delta t}{L_o}(\underline{V}_{(k)} - \underline{E}_{(k)}) + \underline{i}_{s(k)} \tag{19}$$

The projected stator currents can thus be found for each switch state by evaluating equation (19) using the voltage vector that would result from that switch state.

After the projected stator currents are found, the distortion index, J, can be computed by equations (16) or (17) for each possible switch state. The switch state that yields the minimum value of J is output to the selector 80.

While the above-described method will define a switch state that minimizes the distortion index, another equivalent method is preferable due to its reduced computational overhead. The alternative method of computing the switch state that minimizes the distortion index is illustrated in FIGS. 8 and 9. This method converts the desired stator current vector into an equivalent desired voltage vector, and then finds the switch state that would most closely approximate the desired voltage vector. This method in effect minimizes an equivalent distortion index defined in the $\alpha,\beta$ coordinate system with respect to voltage error:

$$J_3 = (v^*_{s\alpha} - v_{s\alpha})^2 + (v^*_{s\beta} - v_{s\beta})^2 \tag{20}$$

or $$J_4 = |v^*_{s\alpha} - v_{s\alpha}| + |v^*_{s\beta} - v_{s\beta}| \quad (21)$$

where $v^*_{s\alpha}$=desired α axis voltage;

$v^*_{s\beta}$=desired β axis voltage;

$v_{s\alpha}$=actual α axis voltage;

$v_{s\beta}$=actual β axis voltage.

It can be shown that minimizing the voltage differences of equations (20) or (21) is equivalent to minimizing the current differences of equations (16) or (17), since the distortion indices vary only by constant or proportional factors. Due to this equivalence, minimizing the distortion index defined by equations (20) or (21) does control the stator currents, even though the desired currents are converted into desired voltages for evaluating the distortion index.

As shown in FIG. 8, computations are carried out using the 2-phase α,β coordinate system instead of the 3-phase coordinate system in order to eliminate some redundant computational steps. The measured 3 phase stator currents, $i_{s1}$, $i_{s2}$, and $i_{s3}$, are converted into the 2-phase α,β coordinate system using equation (1). The desired field coordinate currents, $i^*_{sd}$ and $i^*_{sq}$, as received from the field orientation converter 62 (FIG. 4), are converted into desired α,β stator currents at time (k) $i^*_{s\alpha(k)}$ and $i^*_{s\beta(k)}$, using equation (3). These values are projected forward in time using the formulas:

$$i^*_{s\alpha(k+1)} = 2\, i^*_{s\alpha(k)} - i^*_{s\alpha(k-1)} \quad (22)$$

$$i^*_{s\beta(k+1)} = 2\, i^*_{s\beta(k)} - i^*_{s\beta(k-1)} \quad (23)$$

The motor emf, in α,β coordinates, is estimated by:

$$E_{60} = \lambda^*_r\, d/dt\, (\cos \Theta^*_s) = -\omega^*_s\, \lambda^*_r \sin(\omega^*_s t) \quad (24)$$

$$E_{62} = \lambda^*_r\, d/dt\, (\sin \Theta^*_s) = \omega^*_s\, \lambda^*_r \cos(\omega^*_s t) \quad (25)$$

The desired voltages in α,β coordinates, $v^*_{s\alpha}$ and $v^*_{s\beta}$, are estimated by the motor model of equation (18), which defines the following equations in discrete time:

$$v_{s\alpha}^* = \frac{L_o\,(i_{s\alpha(k+1)}^* - i_{s\alpha})}{\Delta t} + E_\alpha \quad (26)$$

$$v_{s\beta}^* = \frac{L_o\,(i_{s\beta(k+1)}^* - i_{s\beta})}{\Delta t} + E_\beta \quad (27)$$

Next, instead of solving equation (20) or (21) for each possible switch state, the desired α and β axis voltages, $v^*_{s\alpha}$ and $v^*_{s\beta}$, are compared to the limited number of voltage vectors that could result from the eight possible switch states. These voltage vectors, shown in FIG. 9, have a magnitude of either zero or the DC link voltage, $V_{dc}$, and are aligned with the $s_1$, $s_2$, and $s_3$ axes. The voltage vectors are defined according to the following table:

| State | Switch Setting | $(v_{s\alpha}, v_{s\beta})$ |
|---|---|---|
| 0 | [D̄₁, D̄₂, D̄₃] | $v_{dc}\,(0, 0)$ |
| 1 | [D₁, D̄₂, D̄₃] | $v_{dc}\,(1, 0)$ |
| 2 | [D₁, D₂, D̄₃] | $v_{dc}\,(1/2, \sqrt{3}/2)$ |
| 3 | [D̄₁, D₂, D̄₃] | $v_{dc}\,(-1/2, \sqrt{3}/2)$ |
| 4 | [D̄₁, D₂, D₃] | $v_{dc}\,(-1, 0)$ |
| 5 | [D̄₁, D̄₂, D₃] | $v_{dc}\,(-1/2, -\sqrt{3}/2)$ |
| 6 | [D₁, D̄₂, D₃] | $v_{dc}\,(1/2, -\sqrt{3}/2)$ |
| 7 | [D₁, D₂, D₃] | $v_{dc}\,(0, 0)$ |

Since states 0 and 7 define the same zero voltage, there are seven possible stator voltages that could result from the eight possible switch settings of the active switching devices of the motor-side converter.

Minimizing the distortion index is accomplished by finding which stator voltage vector is closest to the desired voltage vector defined by $v^*_{s\alpha}$ and $v^*_{s\beta}$. Graphically, the α,β coordinate space can be divided into seven regions: an inner circle 84 of radius $v_{dc}/2$, plus six 60° sectors 86–91 of outer radius $v_{dc}$ surrounding the inner circle, each sector having a switch state centered at the outer radius thereof.

Determining the closest voltage vector is a matter of finding into which region the desired voltage vector falls. To do so, the magnitude of the desired voltage vector is first compared to $v_{dc}/2$ to determine whether the desired voltage vector falls within the inner circle 84. If the magnitude of the desired voltage vector is less then one-half of $v_{dc}$, then state 0 or state 7 is the desired switch state. Choosing between state 0 and state 7 is accomplished by selecting the state that requires the fewest number of switches to change state from the previous switch setting.

Next, if the magnitude of the desired voltage vector exceeds $v_{dc}/2$, then the signs of $v^*_{s\alpha}$ and $v^*_{s\beta}$ are examined to determine in which quadrant of the α,β plane the voltage vector falls. If the sign of $v^*_{s\alpha}$ is positive, then states 1, 2, or 6 are candidates, and, if negative, then states 3, 4, or 5 are candidates. If both $v^*_{s\alpha}$ and $v^*_{s\beta}$ are positive, for example, then either state 1 or state 2 is the closest voltage vector. For $v^*_{s\alpha}$ and $v^*_{s\beta}$ positive, state 1 is closest if $v^*_{s\alpha} < \sqrt{3}\, v^*_{s\beta}$, otherwise state 2 is closest. This is so because a dividing line 92 between sector 86 of state 1 and sector 87 of state 2 is inclined at 30° to the α axis, and because:

$$\tan 30° = \frac{v_{s\beta}^*}{v_{s\alpha}^*} = \frac{1}{\sqrt{3}}. \quad (28)$$

The selections between states 3 and 4, 4 and 5, and 1 and 6 in the other quadrants are developed in the same manner. Once the closest voltage vector is found, the switch state associated with that voltage vector is output to the selector 80.

Referring back to FIG. 4, operation with the current controller 76 generating the PWM commutation signals occurs at relatively low speeds, where the DC voltage link offers substantial ceiling voltage. In that situation, the current controller 76 keeps the stator currents in close agreement with the desired stator current values. This operation effectively results in current sources for the stator windings, which allows the current controller to ignore the stator voltages.

At higher speeds, however, where the motor emf approaches the voltage of the DC voltage link, the stator voltages can no longer be ignored. In this operating region, the voltage controller 78 takes the stator voltages into consideration.

The selector 80 senses the rotor speed, $\omega_r$, and selects the voltage controller 78 instead of the current controller 76 when the rotor speed exceeds a predetermined value. This value can be determined empirically by observing the distortion of the current waveform during operation of the current controller at various speeds. Preferably, some hysteresis is built into the switching point of the selector 80 so that small oscillations of the rotor speed about the switching point do not cause repeated switching between current control and voltage control. As an alternative to or in addition to monitoring the rotor speed, the DC link voltage and the motor emf can be monitored to determine at which point to switch between current control and voltage control. Monitoring the DC link voltage is not necessary in the preferred embodiment because the line-side controller 52 maintains that voltage at a fairly constant value.

Like the current controller 76, the voltage controller 78 periodically generates a set of PWM commutation signals for switching on and off the active switches of the motor-side converter. The voltage controller 78 monitors the desired and actual torque and flux, as defined by the field oriented currents, $i^*_{sd}$ and $i^*_{sq}$, compensates for the stator voltages, and generates field oriented control voltages, $v^*_{sd}$ and $v^*_{sq}$, which are used to generate the commutation signals.

The stator voltages, in field coordinates, are defined by the following equations:

$$\frac{\sigma L_s \dot{i}_{sd}}{R_s} + i_{sd} = \frac{v_{sd}}{R_s} - \frac{(1-\sigma) L_s \dot{\lambda}_r}{R_s L_o} + \frac{\sigma L_s \omega_s i_{sq}}{R_s} \quad (29)$$

$$\frac{\sigma L_s \dot{i}_{sq}}{R_s} + i_{sq} = \frac{v_{sq}}{R_s} - \frac{(1-\sigma) L_s \omega_s \lambda_r}{R_s L_o} + \frac{\sigma L_s \omega_s i_{sd}}{R_s} \quad (30)$$

where:

$\sigma$=total or global leakage factor;

$L_s$=stator inductance;

$R_s$=stator resistance.

The last two terms on the right sides of equations (29) and (30) are coupling terms for which compensation is required to eliminate cross coupling between the direct and quadrature axes. The goal is to define $v^*_{sd}$ as a function of $i^*_{sd}$ and $v^*_{sq}$ as a function of $i^*_{sq}$. Eliminating the cross coupling terms allows $v^*_{sd}$ to control rotor flux and $v^*_{sq}$ to control torque.

Figure 10:
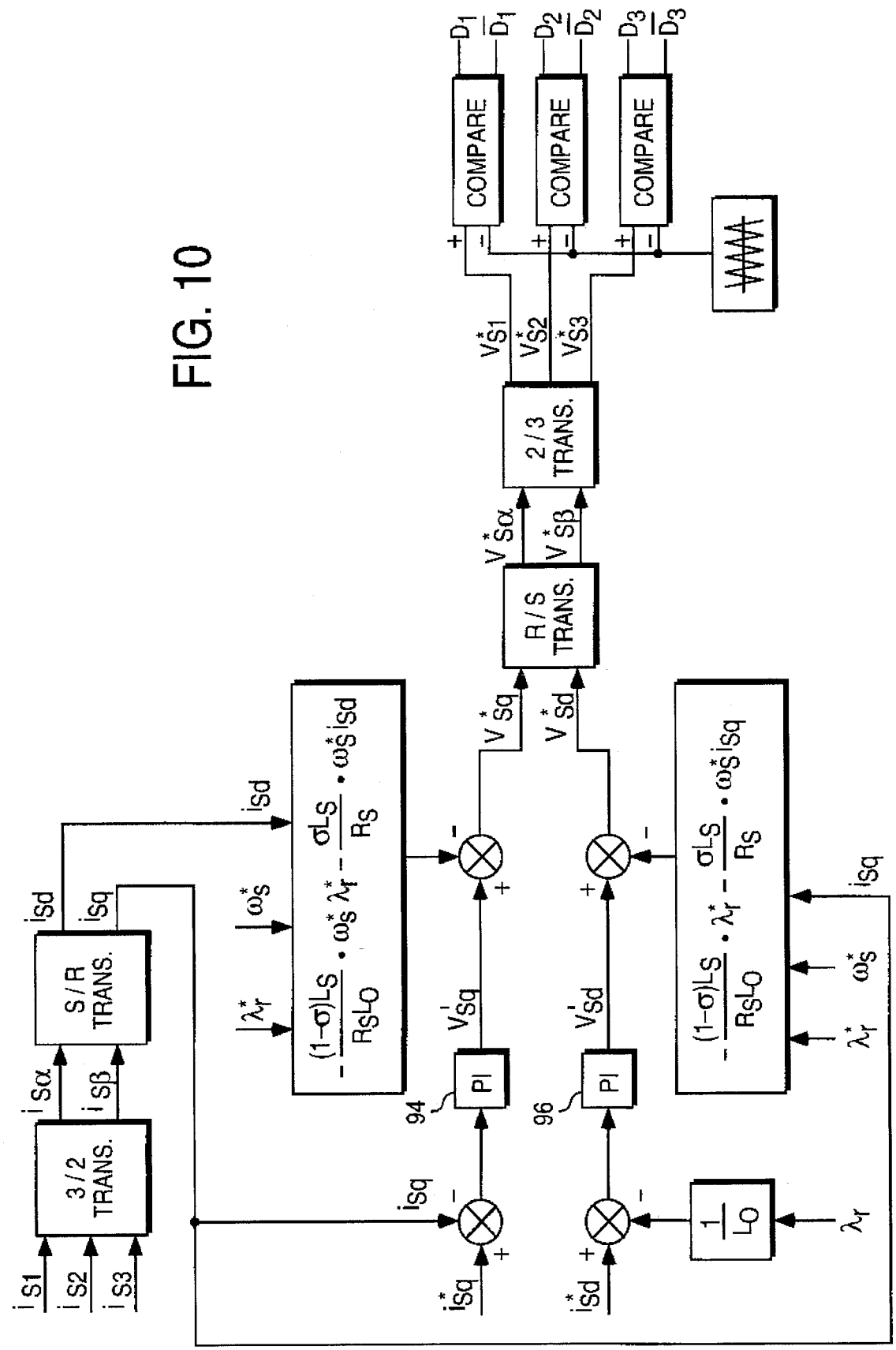
FIG. 10 is a block diagram of a voltage controller of the present invention.

The operation of the voltage controller 78 is shown in FIG. 10. The actual 3 phase stator currents, $i_{s1}$, $i_{s2}$, $i_{s3}$, are converted into field oriented coordinates by equation (1) defining a 3 phase to 2 phase transformation and equation (2) defining a stationary to rotary transformation. The desired voltage on the quadrature axis, $v^*_{sq}$, is defined by first subtracting the actual quadrature current, $i_{sq}$, from the desired quadrature current, $i^*_{sq}$, and then running the resultant through a proportional-integral (PI) controller 94 to define $v'_{sq}$, which is a measure of quadrature axis current error. The PI controller supplies a proportional/integral output of the form:

$$v'_{sq} = k_p (i^*_{sq} - i_{sq}) + k_i \int (i^*_{sq} - i_{sq}) dt \quad (31)$$

where $k_p$ and $k_i$ are coefficients selected to provide adequate stability. Equation (31) can be evaluated in discrete time by the following:

$$v'_{sq(k)} = v'_{sq(k-1)} + (k_p + \Delta t\, k_i)(i^*_{sq(k)} - i_{sq(k)}) - k_p (i^*_{sq(k-1)} - i_{sq(k-1)}) \quad (32)$$

The value of $v'_{sq}$ is then compensated by adding a decoupling factor consisting of the two voltage coupling terms on the right side of equation (30), which results in $v^*_{sq}$ as follows:

$$v_{sq}^* = v_{sq}' + \frac{(1-\sigma) L_s \omega_s^* \lambda_r^*}{R_s L_o} + \frac{\sigma L_s \omega_s^* i_{sd}}{R_s} \quad (33)$$

Similarly, the desired voltage on the direct axis, $v^*_{sd}$, is defined by first subtracting the rotor flux divided by the mutual inductance, $\lambda^*_r/L_o$, from the desired direct axis current, $i^*_{sd}$. The resultant is then input to another PI controller 96, which defines $V'_{sd}$ as a measurement of direct axis current error. PI controller 96 is similar to the PI controller 94 for the quadrature component The value of $v'_{sd}$ is then compensated by adding a decoupling factor consisting of the two voltage coupling terms on the right side of equation (29), which results in $v^*_{sd}$ as follows:

$$v_{sd}^* = v_{sd}' + \frac{(1-\sigma) L_s \dot{\lambda}_r^*}{R_s L_o} - \frac{\sigma L_s \omega_s^* i_{sq}}{R_s} \quad (34)$$

Once the desired field coordinate voltages, $V^*_{sd}$ and $v^*_{sq}$, have been defined, they are transformed into 3-phase stator voltages by equation (3) defining a rotary to stationary transformation and equation (4) defining a 2 phase to 3 phase transformation, resulting in $v^*_{s1}$, $v^*_{s2}$, and $v^*_{s3}$. These reference voltages are modulated by a triangular carrier wave to generate the PWM commutation signals, $D_1$, $\overline{D}_1$, $D_2$, $\overline{D}_2$, $D_3$, and $\overline{D}_3$ that are sent to the selector 80 (FIG. 4). In the preferred embodiment, the triangular carrier wave has a frequency of about 8 kHz, while the comparisons between the reference voltages and the carrier wave are performed continuously or at a rate much higher than 8 kHz.

Figure 11:
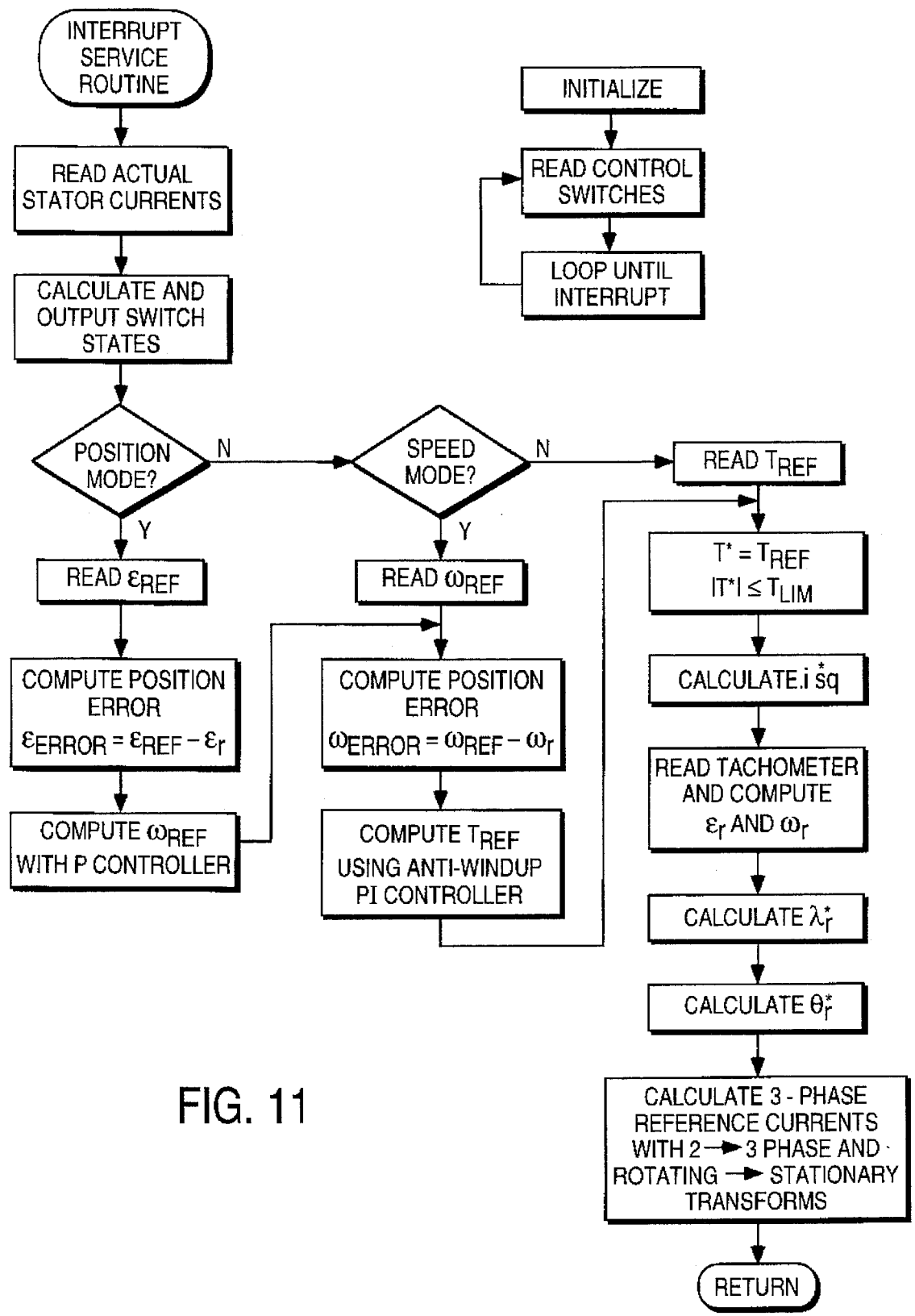
FIG. 11 is a block diagram of a computer program used in the motor-side controller of the present invention.

FIG. 11 illustrates how a computer program is structured for execution in the digital signal processor of the motor-side controller 36. The program consists primarily of a main loop and an interrupt service routine. The main loop initializes the necessary variables, and then loops until it is interrupted, which occurs periodically. The interrupt service routine performs the calculations necessary for generating the PWM commutation signals, and then updates the control variables. Upon interrupt, the interrupt service routine first reads the stator currents, and then executes the code of either the current controller or the voltage controller to generate and output the appropriate switch states. The interrupt routine then branches depending on the control mode that has been selected. If the torque mode is selected, the interrupt routine reads a value for the torque reference signal, $T_{ref}$. If the speed mode is selected, the interrupt routine reads a value for the speed reference signal, $\omega_{ref}$, then computes a speed error, $\epsilon_{ref} - \epsilon_r$, and computes $T_{ref}$ using a proportional-integral controller implementing equation (5). If the position mode is selected, the interrupt routine reads a value for the position reference signal, $\epsilon_{ref}$, then computes a position error, $\epsilon_{ref} - \epsilon_r$, computes the speed reference signal, $\omega_{ref}$, using a proportional controller and enters the speed mode branch, which computes the speed error and $T_{ref}$. Regardless of the control mode, the interrupt service routine eventually ends up with a value of $T_{ref}$. From that point, the interrupt service routine limits the value of $T_{ref}$, which results in the desired torque $T^*$, and updates the corresponding value of the desired quadrature axis current, $i^*_{sq}$. The routine then reads the speed sensor and computes a new value for the rotor speed, $\omega_r$, and position, $\epsilon_r$. The routine updates the value for desired rotor flux, $\lambda^*_r$, and the desired instantaneous rotor flux angle, $\Theta^*_s$. The interrupt service routine then transforms the desired field oriented currents into stationary 3 phase values.

The interrupt routine then returns to the main loop, which waits until the next periodic interrupt, at which time the updated values will be used to compute the switch states. All constants used in the calculations are computed in advance, and the expressions are arranged to avoid division, which executes relatively slowly in a DSP. The steps performed in the computer program can be executed in different order than is shown in FIG. 11, but it is important to calculate and output the switch states as soon as possible after reading the actual stator currents.

Figure 12:
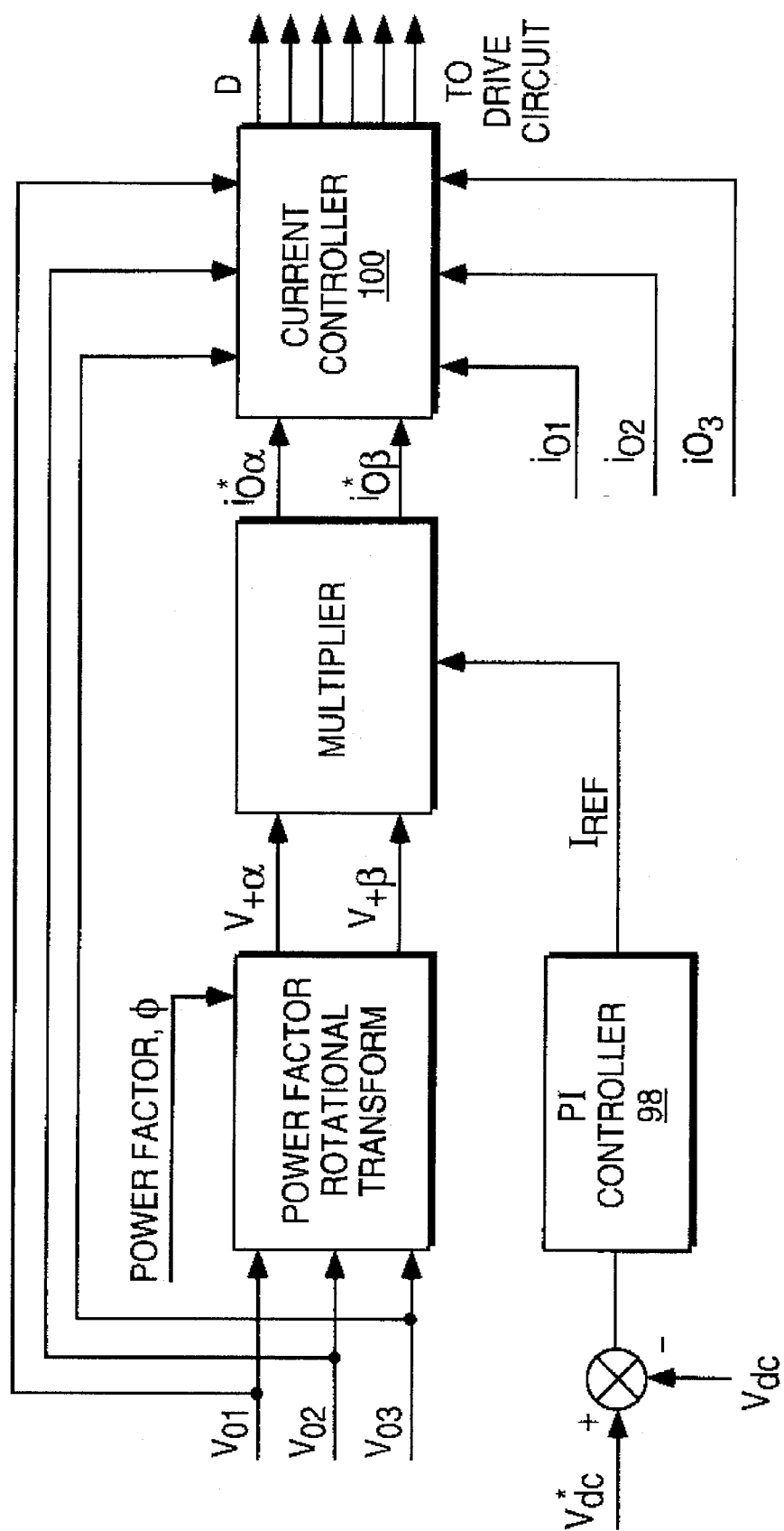
FIG. 12 is a block diagram of a line-side controller of the present invention.
Figure 13:
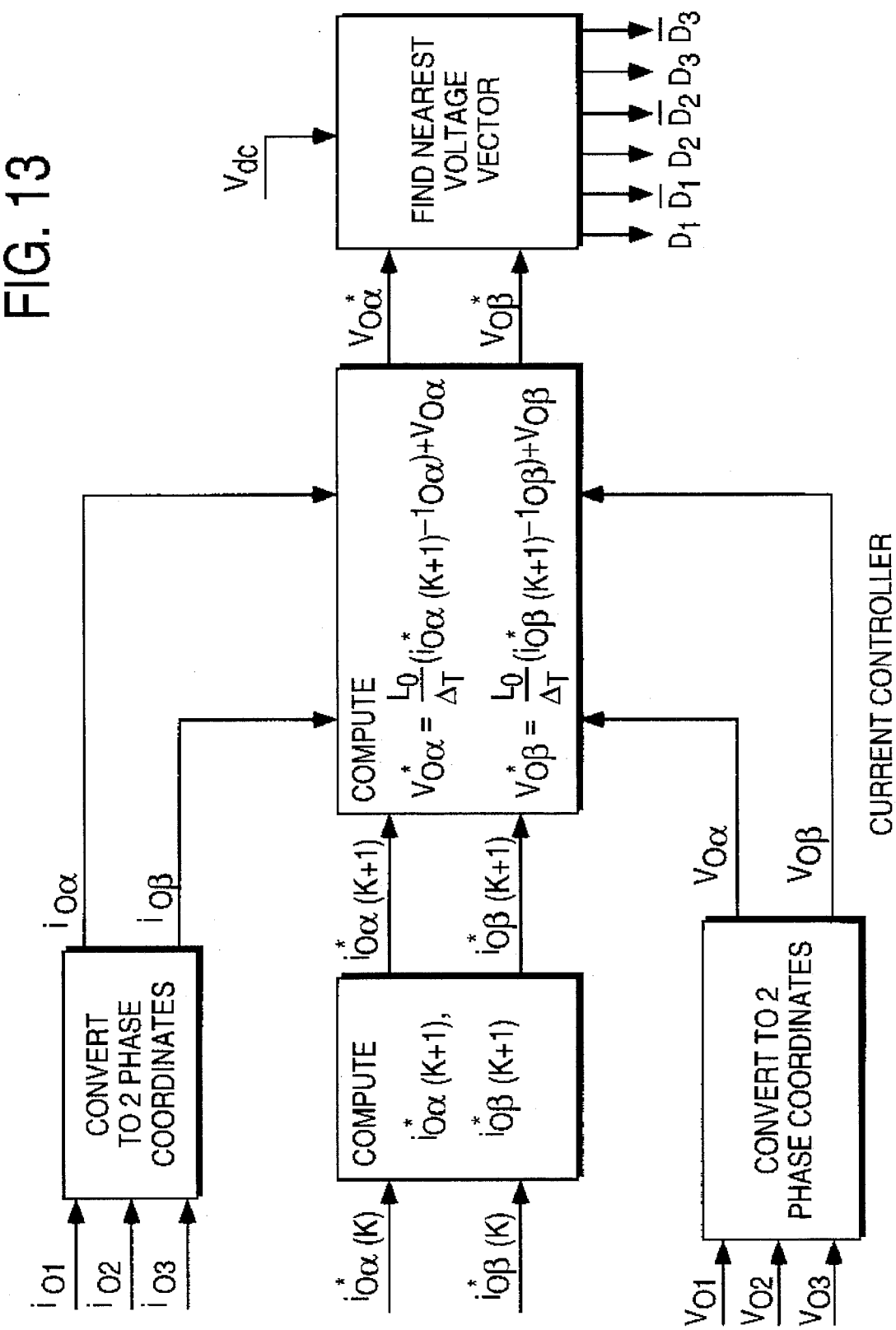
FIG. 13 is a block diagram of a current controller used in the line-side controller of the present invention.
Figure 14:
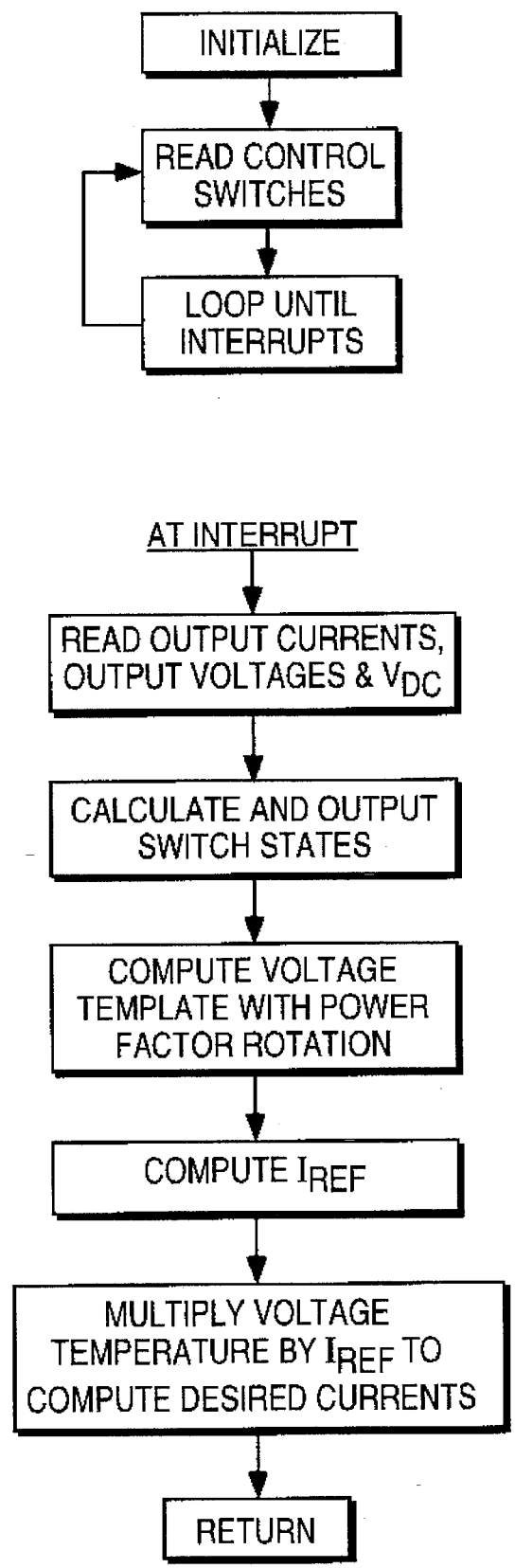
FIG. 14 is a block diagram of a computer program used in the line-side controller of the present invention.

Turning now to the line-side converter 16 of the motor controller 10, the details of the line-side controller 52 are shown in FIGS. 12–14. Like the motor-side controller 36, the line-side controller 52 is preferably implemented with a digital signal processor, a Texas Instruments model TMS320C25. Computer code for implementing the line-side control function in a DSP is disclosed in the microfiche appendix.

The line-side controller 52 controls the line-side bridge inverter 42 to draw from or supply to the utility grid power with adjustable power factor and low THD. The line-side bridge circuit 42 can supply or absorb reactive power as needed by adjusting the phase difference between the line voltage and current. Low harmonic distortion is achieved in the same way as in the current controller 76 of the motor-side controller 36, by periodically minimizing a distortion index. In addition, the line-side controller 52 also controls the voltage of the DC voltage link 18, to maintain it at a desired value.

As shown in FIG. 12, the line-side controller 52 uses the line voltage as a sinusoidal waveform reference, rotates the reference waveform by a certain phase angle to generate a rotated reference waveform, or "template", then multiplies the template waveform by a factor, $I_{ref}$, derived from the DC link voltage, $V_{dc}$, to generate a desired current waveform. The actual currents are compared to the desired currents to generate the PWM commutation signals for the line-side switches 44. All of the calculations of the line-side controller 52 are performed periodically. In the preferred embodiment, the DSP cycles through its calculations every 125 microseconds, equal to a rate of 8 kHz.

The multiplication factor, $I_{ref}$, is calculated as follows. The measured DC link voltage, $v_{dc}$, is subtracted from a desired value of the DC link voltage, $v^*_{dc}$, to generate an error, which is then input to a PI controller 98. The PI controller 98 supplies a proportional/integral output of the form:

$$I_{ref} = k_p (v^*_{dc} - v_{dc}) + k_i \int (v^*_{dc} - v_{dc}) \, dt \quad (35)$$

where $k_p$ and $k_i$ are coefficients selected to provide adequate stability. In discrete time, equation (35) can be evaluated as follows:

$$I_{ref(k)} = I_{ref(k-1)} + (k_p + \Delta t \, k_i) (v^*_{dc(k)} - v_{dc(k)}) - k_p (v^*_{dc(k-1)} - v_{dc(k-1)}) \quad (36)$$

The rotational transformation of the reference waveform can be accomplished in either 3-phase or 2-phase coordinates. In 3-phase coordinates, the template waveform, rotated by an angle $\Theta$, is calculated as follows:

$$v_{t1} = (\cos\phi + \sqrt{3}/3 \sin\phi) v_{o1} + (2\sqrt{3}/3 \sin\phi) v_{o2} \quad (37)$$

$$v_{t2} = (\cos(\phi + 2\pi/3) + \sqrt{3}/3 \sin(\phi + 2\pi/3)) v_{o1} + (2\sqrt{3}/3 \sin(\phi + 2\pi/3)) v_{o2} \quad (38)$$

$$v_{t3} = -v_{t1} - v_{t2} \quad (39)$$

These values can be transformed into the 2-phase 60, β coordinate system using equation (1). The result is $v_{t\alpha}$ and $v_{t\beta}$. The template values that result from the rotational transformation, $v_{t\alpha}$ and $v_{t\beta}$, are then multiplied by the value of $I_{ref}$ to define the desired 2-phase line currents, $i^*_{o\alpha}$ and $i^*_{o\beta}$. The desired line currents are input into a current controller 100, which compares them to the actual currents and generates the appropriate PWM commutation signals for the line-side switches.

The current controller 100 of the line-side controller can be implemented in the several ways described above for the current controller 76 of the motor-side controller, including the delta modulator. Preferably, however, the current controller 100 generates switch states that minimize the distortion index, J, in a manner similar to that described above with respect to FIGS. 8 and 9. Referring to FIG. 13, the line-side current controller defines desired line voltages, $v^*_{o\alpha}$ and $v^*_{o\beta}$, according to the following equations:

$$v_{o\alpha}^* = \frac{L_o (i_{o\alpha(k+1)}^* - i_{o\alpha})}{\Delta t} + v_{o\alpha} \quad (40)$$

$$v_{o\beta}^* = \frac{L_o (i_{o\beta(k+1)}^* - i_{o\beta})}{\Delta t} + v_{o\beta} \quad (41)$$

where:

$L_o$ is the line impedance;

$i^*_{o\alpha(k+1)}$ and $i^*_{o\beta(k+1)}$ are the desired line currents at time=k+1 in α,β coordinates;

$i_{o\alpha}$ and $i_{o\beta}$ are the measured line currents in α,β coordinates;

$v_{o\alpha}$ and $v_{o\beta}$ are the measured line voltages in α,β coordinates;

$\Delta t$ is the sample period.

The desired line voltages, $v^*_{o\alpha}$ and $v^*_{o\beta}$, are then compared to the seven available voltage vectors, and the switch state associated with the nearest voltage vector is selected and output to the line-side switches 44. Determining the nearest voltage vector is accomplished in the same manner as explained above with respect to the motor current controller of FIGS. 8 & 9.

A computer program directs the operation of the digital signal processor of the line-side controller to perform the calculations described above. As shown in FIG. 14, the computer program is structured like that of the motor-side controller 36 in that a main loop executes until periodically interrupted, and then an interrupt service routine updates the sensed inputs, PWM switch state, and calculated variables. The interrupt service routine running on the line-side controller DSP first reads the line currents, line voltages and DC link voltage. Then it calculates the optimal switch state, which it outputs to the line-side switches. Then the interrupt routine performs calculations necessary for the next calculation of switch state by rotating the voltage reference to define the template waveform, computing the multiplication factor $I_{ref}$, and multiplying the template waveform by $I_{ref}$ to compute the desired currents for the next interrupt. Then control returns to the main loop, where it waits until interrupted again. In the preferred embodiment, interruptions occur at a rate of about 8 kHz.

Referring back to FIG. 2, the power factor controller 58 can control either the power factor angle, $\phi$, or the magnitude of reactive power to supply VARs (volt-ampere-reactive) to the utility. The type of power factor control is specified by the operation mode signal that is input into the power factor controller. If the power factor angle is controlled, the power factor controller 58 outputs to the line-side controller 52 a constant value of $\phi$ that is defined by the power factor input signal. If the reactive power is controlled, the power factor controller monitors the reactive power feedback signal, $Q_{fb}$, compares it to a desired reactive power level defined by the reactive power input signal, and adjusts the power factor angle, $\phi$, to obtain the desired reactive power.

The power factor correction facility of the line-side controller 52 can be utilized even when the motor 12 is not operating, by operating in a static VAR mode. To do so, the power factor controller 58 sets the power factor angle $\phi$ equal to 90°. After the DC link is charged up by the utility through the line-side bridge circuit 42, the line-side controller operates as described above to rotate the line current to lead the voltage by 90°. In static VAR mode, the line-side controller 52 controls just the reactive power component of the electrical power flowing through the line-side converter 16. This supplies reactive power to the utility to counteract reactive loads drawing power from the utility grid.

From the above description, it will be apparent that the invention disclosed herein provides a novel and advantageous motor controller. The foregoing discussion discloses and describes merely exemplary methods and embodiments of the present invention. As will be understood by those familiar with the art, the invention may be embodied in other specific forms without departing from the spirit or essential characteristics thereof. For example, some aspects of the current controller can be performed in various ways equivalent to those disclosed herein, including using hysteresis control or forced oscillation with triangular intersection. The motor need not be a three-phase squirrel-cage induction motor, but may be any multiphase motor, including a synchronous motor. In addition, the torque monitor could directly measure torque with a transducer, instead of inferring torque from the measured stator currents. Accordingly, the disclosure of the present invention is intended to be illustrative, but not limiting, of the scope of the invention, which is set forth in the following claims.

What is claimed is:

1. A multiphase AC self-commutated bridge circuit comprising:

active switches coupled in a bridge configuration and defining a current path for each phase, wherein the state of each active switch determines the direction of current flowing therethrough;

current sensor means for sensing currents in each current path;

means responsive to a reference signal for determining desired currents;

means for periodically determining a distortion index indicative of errors between the desired and actual currents; and means for controlling the active switches to produce currents that minimize the distortion index, wherein the means for controlling the active switches generates signals that are complimentary for each pair of active switches causing one active switch of each pair to switch on and the other active switch of the pair to switch off as appropriate to minimize the distortion index.

2. A bridge circuit as recited in claim 1 further comprising means for periodically computing a distortion index for each combination of switch states of the active switches and for periodically selecting a switch state that minimizes the distortion index.

3. A bridge circuit as recited in claim 1 further comprising means for converting the desired bridge circuit currents into desired bridge circuit voltages, means for comparing the desired bridge circuit voltages to the voltages that would result from each combination of switch states of the active switches, and means for choosing the switch state having associated voltages that are nearest to the desired bridge circuit voltages.

4. A bridge circuit as recited in claim 1 wherein the distortion index is proportional to the sum of the squares of the current errors.

5. A bridge circuit as recited in claim 1 wherein the distortion index is proportional to the sum of the absolute value of the current errors.

6. A motor control apparatus for controlling a multiphase AC motor having stator windings and a rotor and powered by a source of AC power, the apparatus comprising:

motor command means for defining a reference signal indicative of a desired motor parameter;

current sensor means for sensing stator currents of the motor;

a DC voltage link including means for storing energy;

a self-commutated line-side converter means coupled to the DC voltage link for controlling the bidirectional flow of electrical power between the DC voltage link and the source of AC power, wherein the line-side converter includes active switches coupled in a bridge configuration between the source of AC power and the DC voltage link, and includes line-side control means for controlling the active switches therein to regulate the flow of electrical power therethrough; and motor-side converter means coupled to the DC voltage link for controlling stator currents of the motor by controlling the bidirectional currents between the DC voltage link and the motor, wherein the motor-side converter includes active switches coupled in a bridge configuration between the DC voltage link and the stator windings of the motor, includes motor-side control means responsive to the reference signal for determining desired stator currents, includes means for periodically determining a distortion index indicative of errors between the desired and actual stator currents, and includes means for controlling the active switches therein to produce stator currents that minimize the distortion index, wherein the means for controlling the active switches generates signals that are complimentary for each pair of active switches, causing one active switch of each pair to switch on and the other active switch of the pair to switch off as appropriate to minimize the distortion index.

7. A motor control apparatus as recited in claim 6 wherein the motor-side control means further includes means for periodically computing a distortion index for each combination of switches states and for periodically selecting a switch state that minimizes the distortion index.

8. A motor control apparatus as recited in claim 6 wherein the motor-side control means further includes means for converting the desired stator currents into desired stator voltages, means for comparing the desired stator voltages to the voltages that would result from each combination of switch states of the active switches, and means for choosing the switch state having associated voltages that are nearest to the desired stator voltages.

9. The motor control apparatus of claim 6 wherein the means for storing energy in the DC voltage link includes a battery.

10. A motor control apparatus for controlling a multiphase AC motor having stator windings and a rotor and powered by a source of AC power, the apparatus comprising:

motor command means for defining a reference signal indicative of a desired motor parameter;

current sensor means for sensing stator currents of the motor;

a DC voltage link including means for storing energy;

a self-commutated line-side converter means coupled to the DC voltage link for controlling the bidirectional flow of electrical power between the DC voltage link and the source of AC power, wherein the line-side converter includes active switches coupled in a bridge configuration between the source of AC power and the DC voltage link, and includes line-side control means for controlling the active switches therein to regulate the flow of electrical power therethrough, wherein the line-side control means includes means for determining desired line currents, includes means for sensing the actual line currents, includes means for periodically determining a distortion index indicative of errors between the desired and actual line currents, and includes means for controlling the active switches therein to produce line currents that minimize the distortion index, wherein the means for controlling the active switches generates signal that are complimentary for each pair of active switches, causing one active switch of each pair to switch on and the other active switch of the pair to switch off as appropriate to minimize the distortion index; and motor-side converter means coupled to the DC voltage link for controlling stator electrical quantities of the motor by controlling the bidirectional flow of electrical power between the DC voltage link and the motor, wherein the motor-side converter includes active switches coupled in a bridge configuration between the DC voltage link and the stator windings of the motor, and includes motor-side control means responsive to the reference signal for controlling the active switches therein to produce stator electrical quantities that correspond to the reference signal.

11. A motor control apparatus as recited in claim 10 wherein the line-side control means further includes means for periodically computing a distortion index for each combination of switch states and for periodically selecting a switch state that minimizes the distortion index.

12. A motor control apparatus as recited in claim 10 wherein the line-side control means further includes means for converting the desired line currents into desired line voltages, means for comparing the desired line voltages to the voltages that would result from each combination of switch states of the active switches, and means for choosing the switch state having associated voltages that are nearest to the desired line voltages.

13. A method for controlling currents switched by a self-commutated bridge circuit containing active switches, the method comprising the steps of:

determining desired bridge circuit currents;

sensing the actual bridge circuit currents; and switching the active switches to produce bridge circuit currents that minimize a distortion index indicating the magnitude of current errors between the actual and desired bridge circuit currents, wherein the step of switching the active switches comprises the steps of generating signals that are complimentary for each pair of active switches, and causing one active switch of each pair to switch on and the other active switch of the pair to switch off as appropriate to minimize the distortion index.

14. A method for controlling currents as recited in claim 13 further comprising the step of periodically computing a distortion index for each combination of switch states and selecting a switch state that minimizes the distortion index.

15. A method for controlling currents as recited in claim 13 further comprising the steps of converting the desired bridge circuit currents into desired bridge circuit voltages, comparing the desired bridge circuit voltages to the voltages that would result from each combination of switch states of the active switches, and choosing the switch state having associated voltages that are nearest to the desired bridge circuit voltages.

16. A method for controlling currents as recited in claim 13 further comprising the step of computing a distortion index that is proportional to the sum of the squares of the current errors.

17. A method for controlling currents as recited in claim 13 further comprising the step of computing a distortion index that is proportional to the sum of the absolute value of the current errors.

18. A method for controlling stator currents in a multiphase AC motor rotating at variable speeds, wherein the stator currents are switched by a self-commutated bridge circuit that includes active switches, the method comprising the steps of:

defining a reference signal indicative of a desired motor torque, speed, or position;

converting the reference signal into desired stator currents;

sensing the actual stator currents;

determining a distortion index indicative of the magnitude of current errors between the actual and desired stator currents; and supplying pulse width modulation signals to the active switches to produce stator currents that minimize the distortion index, wherein the step of supplying pulse width modulation signals comprises the steps of generating signals that are complimentary for each pair of active switches, and causing one active switch of each pair to switch on and the other active switch of the pair to switch off as appropriate to minimize the distortion index.

19. A method for controlling currents in a motor as recited in claim 18 wherein electrical power for powering the motor is supplied to the bridge circuit from a second bridge circuit that is coupled to a source of AC power, wherein the second bridge circuit includes active switches, wherein the method further comprises determining a signal indicative of desired line currents of the second bridge circuit, sensing the actual line currents of the second bridge circuit, determining a second distortion index indicative of the magnitude of current errors between the actual and desired line currents, and supplying pulse width modulation signals to the active switches of the second bridge circuit to produce line currents that minimize the second distortion index.

20. A method for controlling stator currents in a multiphase AC motor rotating at variable speeds to obtain torque, speed, or position control of the motor, wherein the stator currents are switched by an self-commutated active rectifier that establishes a rotating flux field in the rotor of the motor, the method comprising the steps of:

defining a reference signal indicative of a desired motor torque, speed, or position;

determining a desired direct axis current representing rotor flux in a direction aligned with the rotor flux field in a rotating field coordinate system;

converting the reference signal into a desired quadrature axis current representing rotor torque, wherein the quadrature axis current is normal to the rotor flux field in the field coordinate system;

sensing the rotational speed of the rotor;

sensing the actual stator currents;

determining a rotor flux angle indicative of the instantaneous position of the rotor flux field;

converting the desired quadrature and direct axis currents into desired stator currents in a stationary stator coordinate system using the rotor flux angle;

determining a distortion index indicative of the magnitude of current errors between the actual and desired stator currents; and supplying pulse width modulation signals to the switches of the active rectifier to produce stator currents that minimize the distortion index, wherein the step of supplying pulse width modulation signals comprises the steps of generating signals that are complimentary for each pair of active switches, and causing one active switch of each pair to switch on and the other active switch of the pair to switch off as appropriate to minimize the distortion index.

* * * * *